(12) United States Patent
Park

(10) Patent No.: US 11,184,576 B2
(45) Date of Patent: Nov. 23, 2021

(54) IMAGE DISPLAY APPARATUS AND CONTROL METHOD THEREFOR

(71) Applicant: SAMSUNG ELECTRONICS CO., LTD., Suwon-si (KR)

(72) Inventor: Chan Sub Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/760,285

(22) PCT Filed: Oct. 26, 2018

(86) PCT No.: PCT/KR2018/012791
§ 371 (c)(1),
(2) Date: Apr. 29, 2020

(87) PCT Pub. No.: WO2019/088583
PCT Pub. Date: May 9, 2019

(65) Prior Publication Data
US 2020/0260046 A1 Aug. 13, 2020

(30) Foreign Application Priority Data
Oct. 30, 2017 (KR) .................. 10-2017-0142338

(51) Int. Cl.
*H04N 5/50* (2006.01)
*H04N 5/44* (2011.01)
(Continued)

(52) U.S. Cl.
CPC ............ *H04N 5/50* (2013.01); *H04N 21/426* (2013.01); *H04N 21/434* (2013.01); *H04N 21/472* (2013.01)

(58) Field of Classification Search
CPC ...... H04N 21/426; H04N 5/4401; H04N 5/44; H04N 5/268; H04N 21/434; H04N 21/472;
(Continued)

(56) References Cited

U.S. PATENT DOCUMENTS

| 6,950,772 B1 | 9/2005 | Callway |
| 7,692,726 B1 | 4/2010 | Greenberg |
| 7,701,515 B2 | 4/2010 | Gomez et al. |

(Continued)

FOREIGN PATENT DOCUMENTS

| JP | 2012-227931 A | 11/2012 |
| KR | 10-1425221 B1 | 8/2014 |

OTHER PUBLICATIONS

Communication dated Jul. 14, 2020 issued by the European Patent Office in European Application No. 18871908.2.
(Continued)

*Primary Examiner* — Sherrie Hsia
(74) *Attorney, Agent, or Firm* — Sughrue Mion, PLLC

(57) ABSTRACT

A display apparatus may include an input terminal configured to receive an analog video signal; a tuner configured to receive a broadcast signal; a rear multiplexer configured to multiplex at least two of the analog video signal and an output signal of the tuner; an analog digital converter configured to convert the output signal of the rear multiplexer into a digital signal; and a decoder configured to decode the digital signal. The tuner may include an analog broadcast tuner outputting an analog broadcast video signal and an analog broadcast audio signal; a broadcast tuner; a digital broadcast tuner outputting a digital broadcast signal; and a front multiplexer multiplexing at least two of the analog broadcast video signal and the analog broadcast audio signal and the digital broadcast signal.

15 Claims, 16 Drawing Sheets

(51) Int. Cl.
  *H04N 5/268* (2006.01)
  *H04N 21/426* (2011.01)
  *H04N 21/434* (2011.01)
  *H04N 21/472* (2011.01)

(58) Field of Classification Search
  CPC ............ H04N 5/455; H04N 5/50; H04N 9/64;
                              H04N 9/647; H04N 9/646
  USPC ......... 348/731, 725–728, 705, 706; 725/100,
                              725/68, 70, 85, 131, 139, 151
  See application file for complete search history.

(56) References Cited

U.S. PATENT DOCUMENTS

| | | |
|---|---|---|
| 9,402,062 B2 | 7/2016 | Hsueh et al. |
| 2005/0086706 A1* | 4/2005 | Kasamatsu .......... H04N 21/426 725/139 |
| 2005/0280742 A1 | 12/2005 | Jaffe |
| 2006/0001779 A1 | 1/2006 | Favrat et al. |
| 2007/0118859 A1 | 5/2007 | Tsukahara et al. |
| 2010/0002144 A1* | 1/2010 | Choi ...................... H04N 5/455 348/726 |

OTHER PUBLICATIONS

International Search Report dated Feb. 25, 2019, issued by the International Patent Application No. PCT/KR2018/012791 (PCT/ISA/210).
Written Opinion dated Feb. 25, 2019, issued by the International Patent Application No. PCT/KR2018/012791 (PCT/ISA/237).

* cited by examiner

IMAGE DISPLAY APPARATUS AND CONTROL METHOD THEREFOR

TECHNICAL FIELD

Embodiments of the disclosure relate to an analog front end and a display apparatus, and more specifically, to an analog front end, a method of operating the analog front end, and a display apparatus including an analog front end input apparatus capable of processing various input signals and broadcast signals used in a digital television system.

BACKGROUND ART

In general, an image display apparatus is an apparatus capable of displaying image data of various formats by having a display panel.

The image display apparatus may receive content data from various content sources such as a broadcasting station, an Internet server, a video playback device, a game device, and/or a portable terminal. In addition, the image display apparatus may restore (or decode) an image frame from the content data and display the restored image frame on the display panel.

A cable connecting the image display apparatus and the content source is composed of a signal line and ground, and the content data is transmitted to the image display apparatus through the signal line. At this time, a signal level of the content source and a signal level of the image display apparatus may be different, and the difference between these signal levels is calibrated in a clamping circuit of an analog front end for processing the content source of the image display apparatus.

In addition, a broadcast signal is converted to an intermediate frequency signal (intermediate frequency signal, if) in the form of a differential signal (differential signal) by a tuner of the image display apparatus, the intermediate frequency signal is transmitted to the analog front end for differential signal processing.

In particular, a digital television among the image display apparatuses, unlike conventional televisions using analog signals, may receive video and audio using digital signals. In addition, since a digital television broadcast signal uses digitally compressed and modulated data, a user can watch a broadcast through a television receiver or set-top box designed for the digital television. These digital televisions have several advantages over the conventional televisions, and the most important of them is that a bandwidth occupied by the broadcasting channel can be reduced. In addition, the digital television is capable of multicasting (for example, simultaneously broadcasting a plurality of broadcast programs on one channel).

However, the number of content sources connected to the image display apparatus is increasing due to a variety of types of the content sources.

As a result, the number of the cables connecting each of the image display apparatus and the content sources and the number of connection terminals of the cables are increasing. In addition, the number of analog-to-digital converters that convert the analog signals from the cables into the digital signals is also increasing along with the increase in the number of the connection terminals of the cables.

DISCLOSURE

Technical Problem

One aspect of the disclosed embodiment is to provide a display apparatus capable of minimizing the number of analog-to-digital converters that convert analog signals from cables into digital signals.

Another aspect of the disclosed embodiment is to provide a display apparatus including an analog front end, an analog front end operation method, and the analog front end capable of simultaneously processing various input signals and broadcast signals input to the display apparatus.

Technical Solution

In accordance with an aspect of the disclosure, a display apparatus includes: an input terminal configured to receive an analog video signal; a tuner configured to receive a broadcast signal; a rear multiplexer configured to multiplex at least two of the analog video signal and an output signal of the tuner; an analog-digital converter configured to convert the output signal of the rear multiplexer into a digital signal; a decoder configured to decode the digital signal. The tuner may include an analog broadcast tuner outputting an analog broadcast video signal and an analog broadcast audio signal; a digital broadcast tuner outputting a digital broadcast signal; and a front multiplexer multiplexing at least two of the analog broadcast video signal, the analog broadcast audio signal and the digital broadcast signal.

The display apparatus may further include a clamping/biasing circuit configured to clamp or bias the output signal of the rear multiplexer, according to the analog video signal and the output signal of the tuner.

The clamping/biasing circuit may clamp or bias the output signal of the rear multiplexer according to the analog video signal or the output signal of the tuner when the analog video signal or the analog broadcast video signal is outputted from the rear multiplexer.

The clamping/biasing circuit may bias the output signal (the digital broadcast signal) of the rear multiplexer according to the output signal of the tuner when the digital broadcast signal is outputted from the rear multiplexer.

The front multiplexer may multiplex the analog broadcast video signal and the digital broadcast signal to output a front multiplexed signal, the analog-digital converter may convert the front multiplexed signal into a digital output signal, and the display apparatus may further comprise a digital clamping circuit configured to clamp the digital output signal of the analog-digital converter.

The analog-digital converter may convert the analog broadcast audio signal into a digital output signal, and the display apparatus may further comprise a variable gain amplifier configured to amplify the digital output signal of the analog-digital converter and a gain controller configured to control an amplification factor of the variable gain amplifier.

The tuner may further comprise a variable gain amplifier configured to amplify a digital output signal and a gain controller configured to control an amplification factor of the variable gain amplifier.

The front multiplexer may multiplex the analog broadcast video signal and the digital broadcast signal, and the tuner may further comprise a satellite broadcast tuner configured to output a satellite broadcast signal and another front multiplexer configured to multiplex the analog broadcast audio signal and the satellite broadcast signal.

The tuner may further comprise: a first frequency shifter configured to output a frequency shift audio signal by changing a frequency of the analog broadcast audio signal and a signal synthesizer configured to synthesize the frequency shifted audio signal and the analog broadcast video signal, and the front multiplexer may multiplex the output signal of the signal synthesizer and the digital broadcast signal.

The signal synthesizer may include: a first filter configured to extract the frequency shifted audio signal from the output signal of the signal synthesizer, a second frequency shifter configured to restore the analog broadcast audio signal by changing the frequency shifted audio signal, and a second filter configured to extract the analog broadcast video signal from the output signal of the signal synthesizer.

In accordance with an aspect of the disclosure, an analog front end includes: an analog-to-digital converter configured to convert differential analog signals to a digital code in response to a sampling clock signal, a fractional-N phase locked loop configured to a clock signal as an input signal, and a first selector configured to output one of the clock signal and the output clock signal of the fractional-N phase locked loop as the sampling clock signal in response to a first selection signal.

The analog front end may further comprise a demodulator configured to demodulate the digital code in response to the sampling clock signal.

The analog front end may further comprise a first frequency divider configured to divide a frequency of the output clock signal of the first selector at a first division ratio, a second frequency divider configured to divide a frequency of the clock signal of the first frequency divider at a second division ratio, and a second selector configured to output one of the output clock signal if the first selector and the output clock signal of the second frequency divider as the sampling signal in response to a second selection signal. An aspect of the disclosed embodiment is to provide a display apparatus enable to minimize the number of analog-to-digital converters configured to convert analog signals into digital signals.

In accordance with an aspect of the disclosure, a controlling method of a display apparatus may comprise: first multiplexing at least two of an analog broadcast video signal, an analog broadcast audio signal, and a digital broadcast signal received through a tuner; second multiplexing at least two of an analog video signal, and a first multiplexed signal received through an input terminal; converting a second multiplexing signal into a digital signal; and decoding the digital signal.

The method may further comprise clamping or biasing the second multiplexed signal according to the analog video signal or an output signal of the tuner.

The clamping or biasing the second multiplexed signal may include the clamping of the second multiplexed signal according to the analog video signal or the output signal of the tuner when the second multiplexed signal includes the analog video signal or the analog broadcast video signal.

The clamping or biasing the second multiplexed signal may include the biasing of the second multiplexed signal when the second multiplexed signal includes the digital broadcast signal.

The first multiplexing may include multiplexing the analog broadcast video signal and the digital broadcast signal, and the method may further comprise clamping the digital signal.

Advantageous Effects

Another aspect of the disclosed embodiment is to provide a display apparatus including an analog front end, an analog front end operation method, and the analog front end capable of simultaneously processing various input signals and broadcast signals input to the display apparatus.

BEST MODE

Figure 1:
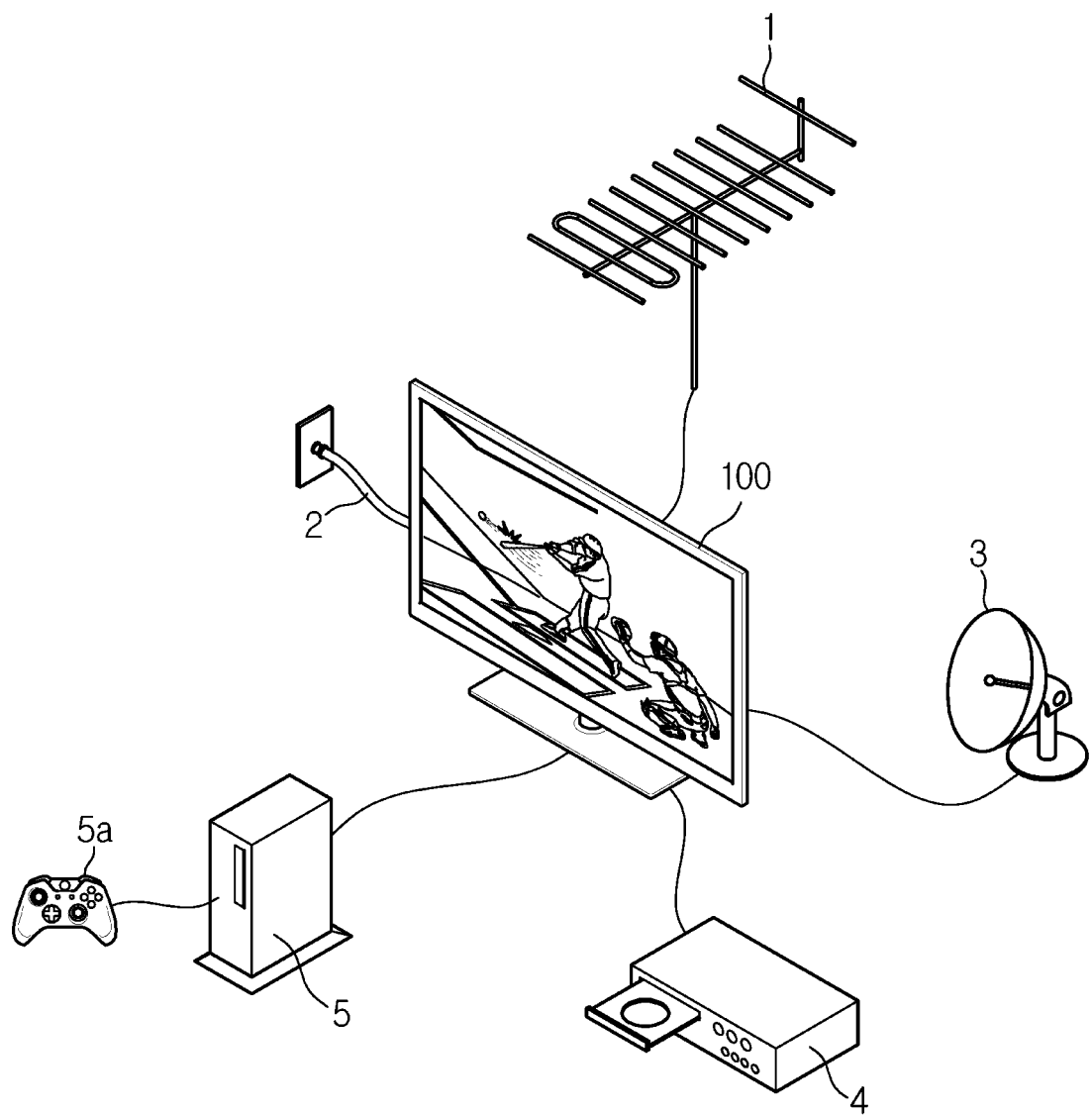
FIG. 1 shows a display apparatus and a content source according to an embodiment.

In the following description, like reference numerals refer to like elements throughout the specification. This specification does not describe all elements of the embodiments, and in the technical field to which the present invention pertains, there is no overlap between the general contents or the embodiments. Terms such as "unit," "module," "member," and "block" may be embodied as hardware or software. According to embodiments, a plurality of "units," "modules," "members," or "blocks" may be implemented as a single component or a single "unit," "module," "member," or "block" may include a plurality of components.

In all specifications, it will be understood that when an element is referred to as being "connected" to another element, it can be directly or indirectly connected to the other element, wherein the indirect connection includes "connection via a wireless communication network."

Also, when a part "includes" or "comprises" an element, unless there is a particular description contrary thereto, the part may further include other elements, not excluding the other elements.

Throughout the specification, when one member is positioned "on" another member, this includes not only the case where one member abuts another member, but also the case where another member exists between the two members.

The terms first, second, etc. are used to distinguish one component from another component, and the component is not limited by the terms described above.

An expression used in the singular form encompasses the expression of the plural form, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described with reference to the accompanying drawings.

FIG. 1 shows a display apparatus and a content source according to an embodiment.

As shown in FIG. 1, a display apparatus 100 may receive a video signal and an audio signal from various content sources 1-5, and output video and audio corresponding to the video signal and the audio signal.

For example, the display apparatus 100 may receive television broadcast content from a broadcast receiving antenna 1. The television broadcast content may include a video signal and an audio signal, and the broadcast receiving antenna 1 may receive the video signal and the audio signal transmitted wirelessly from a transmission tower. At this time, the video signal and the audio signal may be analog signals or digital signals.

For wireless communication (terrestrial broadcast transmission and reception), the television broadcast content may be encoded. Here, "coding" may include compressing video content and audio content to be transmitted, and may include, for example, Moving Picture Experts Group (MPEG), High Efficiency Video Coding (HEVC), and the like. The display apparatus 100 may receive a video signal and an audio signal from the broadcast receiving antenna 1, and output video and audio corresponding to the video signal and the audio signal.

The display apparatus 100 may receive the television broadcast content from a wired cable television operator through a wired cable 2. The display apparatus 100 may receive a video signal and an audio signal of the television broadcast content through the wired cable 2 and output video and audio corresponding to the video signal and the audio signal.

The display apparatus 100 may receive the television broadcast content from a satellite antenna 3. The satellite antenna 3 may receive video signals and audio signals transmitted wirelessly from satellites. The display apparatus 100 may receive a video signal and an audio signal from the satellite antenna 3 and output video and audio corresponding to the video signal and the audio signal.

The display apparatus 100 may receive video content from a video playback apparatus 4 through a cable.

The video play apparatus 4 can store various video contents such as video, drama, and sports, or can play various video contents recorded on a recording medium, and can transmit video signals and audio signals of the video content to the display apparatus 100 through the cable. The display apparatus 100 may receive a video signal and an audio signal from the video play apparatus 4 through the cable, and output video and audio corresponding to the video signal and the audio signal.

The display apparatus 100 may receive game content from a game device 5. The game device 5 generates (renders) an image according to a user input through an input device 5a of the game device 5, and sequentially transfers a plurality of generated images (video content) to the display apparatus 100. Specifically, the game device 5 may transmit a video signal and an audio signal of the video content to the display apparatus 100 through the cable. The display apparatus 100 may receive a video signal and an audio signal from the game device 5 through the cable, and output video and audio corresponding to the video signal and the audio signal.

As such, the display apparatus 100 may receive video signals and audio data from the various content sources 1-5, and decode images (multiple image frames) from the video signals, and displays the images.

The display apparatus 100 may include input terminals and tuners for receiving a video signal and an audio signal from the various content sources 1-5. The input terminals and the tuners are connected to the content sources 1-5 described above, and can receive video and audio signals from the content sources 1-5. In addition, the input terminals and the tuners may have various forms according to the format of a video signal and an audio signal.

The display apparatus 100 is not limited to a television, and the display apparatus 100 may be implemented in various forms such as a monitor, display terminal, portable terminal, laptop computer, projector, and billboard.

Hereinafter, the configuration and operation of the display apparatus 100 will be described.

Figure 2:
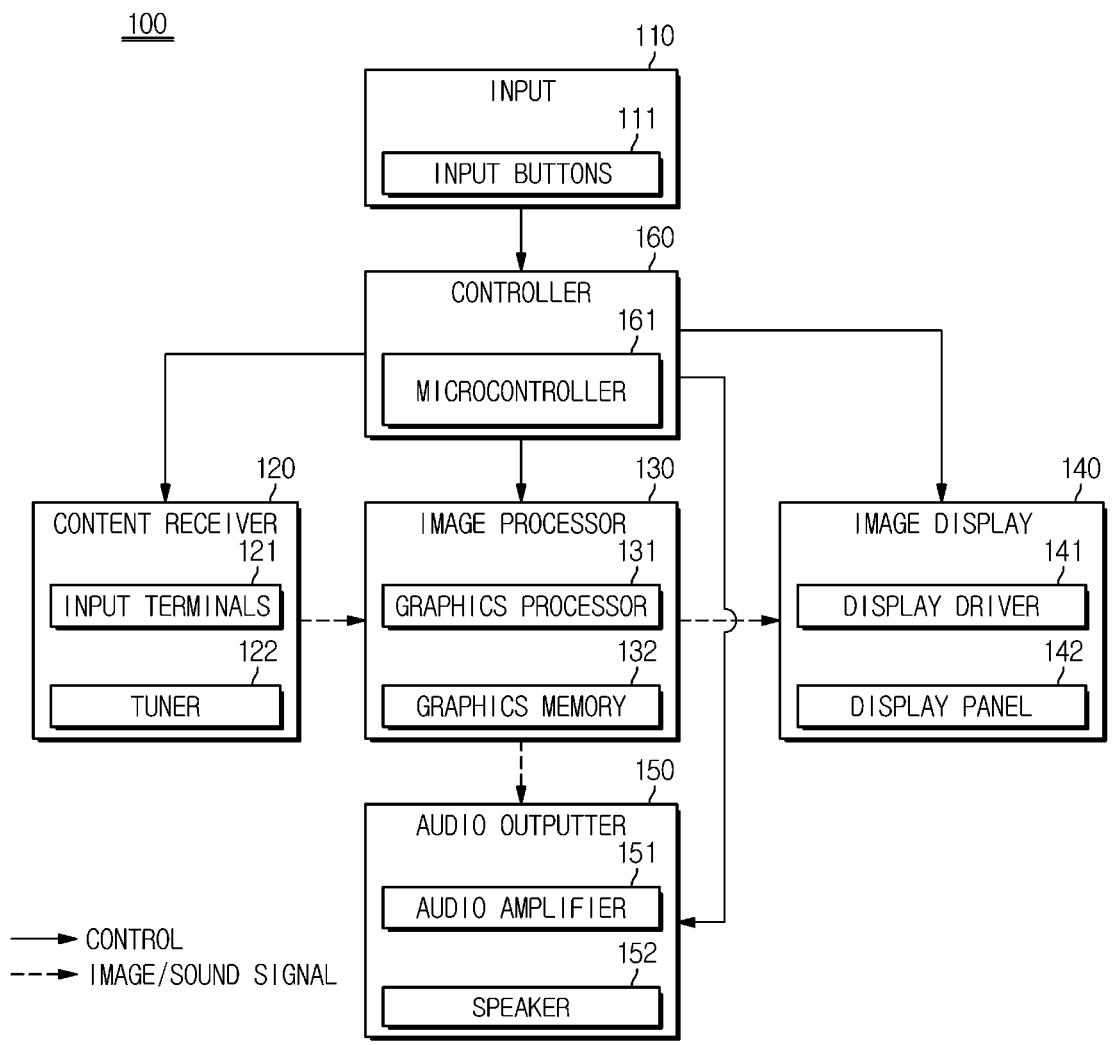
FIG. 2 shows a configuration of a display apparatus according to an embodiment.
Figure 3:
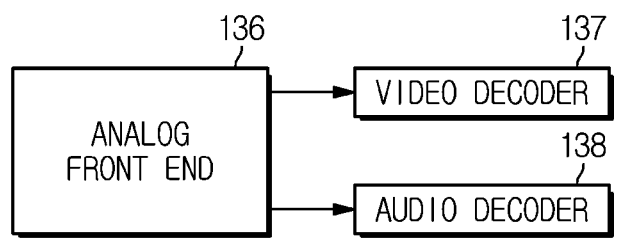
FIG. 3 shows a configuration of an image processor included in a display apparatus according to an embodiment.

FIG. 2 shows a configuration of a display apparatus according to an embodiment. FIG. 3 shows a configuration of an image processor included in a display apparatus according to an embodiment.

As shown in FIG. 2, the display apparatus 100 includes an input 110 for receiving the user input, a content receiver 120 for receiving content data from the content sources 1-5; an image processor 130 for processing the image data included in the content data received by the content receiver 120, an image display 140 for displaying the image processed by the image processor 130, an audio outputter 150 for outputting sound processed by the image processor 130, a controller 160 for controlling the operation of the content receiver 120, the image processor 130, the image display 140 and the audio outputter 150

The input 110 may include input buttons 111 for receiving the user input. For example, the input 110 includes a power button for turning on or off the display apparatus 100, a channel selection button for selecting broadcast content displayed on the display apparatus 100, and sound of the sound output by the display apparatus 100, a sound control button for adjusting the volume, a source selection button for selecting the content source, and the like.

Each of the input buttons 111 may receive the user input and output an electrical signal corresponding to the user input to the controller 160.

These input buttons 111 may be implemented by various input means such as a push switch, a touch switch, a dial, a slide switch, and a toggle switch.

The content receiver 120 may include input terminals 121 and a tuner 122 for receiving content data from the content sources 1-5.

The input terminals 121 may receive a video signal and an audio signal from the video play apparatus 4 or the game device 5 through the cable. In other words, the display apparatus 100 may receive a video signal and an audio signal from the video play apparatus 4 or the game device 5 through the input terminals 121.

The input terminals 121 include, for example, a component (YPbPr/RGB) terminal, a composite (composite video blanking and sync, CVBS) terminal, an audio terminal, a High Definition Multimedia Interface (HDMI) terminal, an Ethernet (Ethernet) terminal, a Universal Serial Bus (USB) terminal, and the like.

The tuner 122 tunes broadcast signals from the broadcast receiving antenna 1, the wired cable 2 or the satellite antenna 3. In other words, the tuner 122 may extract a broadcast signal of a channel selected by the user from among the broadcast signals. For example, the tuner 122 may pass a broadcast signal having a frequency corresponding to a channel selected by the user among the plurality of broadcast signals received through the broadcast receiving antenna 1 and block a broadcast signal having a different frequency.

When a channel is selected by the user, the controller 160 transmits a channel selection signal to the tuner 122, and the tuner 122 may extract the signal of the channel selected by the user among the plurality of broadcast signals according to the channel selection signal of the controller 160.

The tuner 122 may include an analog broadcast tuner for extracting a broadcast signal of a specific channel among analog broadcast signals, a digital broadcast tuner for extracting a broadcast signal of a specific channel among digital broadcast signals, and a satellite broadcast tuner for selecting a specific channel broadcast signal among phase satellite broadcast signals.

As such, the content receiver 120 may receive a video signal and an audio signal from the content sources 1-5 through the input terminals 121 and/or the tuner 122, and output the video and audio signals received through the input terminals 121 and/or the tuner 122 to the image processor 130.

In addition, the content receiver 120 may detect the reception of a video signal and an audio signal through the input terminals 121 and/or the tuner 122, and transmit a content detection signal to the controller 160 according to the detection result.

The user may select any one content source from among the content sources 1-5 connected to the display apparatus 100 through the input 110. In addition, the user can select a channel of broadcast content through the input 110, and in response to the user's channel selection, the controller 160 may output a channel selection signal to the content receiver 120. In response to the channel selection signal, the content receiver 120 may output the broadcast signal of the selected channel to the image processor 130.

The image processor 130 may process video and audio signals received from the content receiver 120 and generate image data and sound data. In addition, the image processor 130 may output image data to the image display 140 and audio data to the audio outputter 150.

When the content source is selected by the user, the controller 160 transmits a content selection signal to the image processor 130, and the image processor 130 receives video signals and audio signals received from the content receiver 120 according to the content selection signal of the controller 160 of which either video signal or audio signal can be selected.

In addition, the image processor 130 may decode a video signal into an image (multiple image frame data), and decode an audio signal into sound.

As shown in FIG. 2, the image processor 130 may structurally include a graphics processor 131 and a graphics memory 132.

The graphics memory 132 may store programs and data for image processing. For example, the graphics memory 132 may store programs and data for decoding an image.

The graphics memory 132 may include a non-volatile memory, such as Read Only Memory (ROM) for storing data for a long period of time, Erasable Programmable Read Only Memory (EPROM), Electrically Erasable Programmable Read Only Memory (EEPROM) and a volatile memory such as Static Random Access Memory (S-RAM) and Dynamic Random Access Memory (D-RAM) for temporarily storing data.

The graphics processor 131 may perform image processing. For example, the graphics processor 131 may decode an image according to the programs and the data stored in the graphics memory 132. In addition, the graphics processor 131 may temporarily store image data in the graphics memory 132 and retrieve the image data from the graphics memory 132.

The graphics processor 131 includes an operation circuit (Arithmetic logic unit, ALU) for performing logical operations and arithmetic operations, and a memory circuit (for example, a register) for storing data and the graphics processor 131, and a control circuit for controlling the operations.

In addition, the image processor 130 may functionally include an analog front end (analog front end, AFE) 136, a video decoder 137, and an audio decoder 138 as shown in FIG. 3.

The analog front end 136 may convert analog signals (video signals and audio signals) output from the content receiver 120 into digital signals.

Because a digital signal has a short transmission distance, it is common that an analog signal is used to transmit a signal or data a long distance. In the case of a video signal and an audio signal transmitted from the content sources 1-5, an analog signal is also used to transmit a signal or data a long distance. In addition, due to advances in digital signal processing technology, it is advantageous to use digital signals for signal processing (e.g., video signal processing and/or sound signal processing).

For this reason, the content receiver 120 may receive an analog type video signal and an audio signal, and the image processor 130 may process a digital type video signal and an audio signal. In addition, the image processor 130 includes the analog front end 136 that converts analog-type video and audio signals into digital-type video and audio signals.

The analog front end 136 may include an analog-to-digital converter (ADC) and a multiplexer (MUX) and a filter for converting an analog signal to a digital signal. The specific configuration and operation of the analog front end 136 is described in more detail below.

The video decoder 137 may generate an image by reconstructing an image from analog image information included in a video signal, or by decoding digital image information included in the video signal. For example, the video decoder 137 may reconstruct an image from the analog image information included in the video signal received through a composite terminal or a component terminal. In addition, the video decoder 137 may decode digital image information included in a video signal using digital image compression algorithms such as Moving Picture Experts Group (MPEG)-2, MPEG4-4, High Efficiency Video Coding (HEVC), and the like.

The audio decoder 138 may restore sound from analog sound information included in an audio signal, or may generate sound data by decoding digital sound information included in the audio signal. The audio decoder 138 may restore sound from the analog sound information included in the audio signal received through the audio terminal. In addition, the audio decoder 138 may decode the digital image information included in the audio signal using digital audio compression algorithms such as Advanced Audio Coding (AAC), High-Efficiency Advanced Audio Coding (HE-AAC), and the like.

Back to FIG. 2, the image display 140 includes a display panel 142 for visually displaying an image, and a display driver 141 for driving the display panel 142.

The display panel 142 may generate an image according to image data received from the display driver 141 and output the image.

The display panel 142 may include a pixel that is a unit for displaying an image. Each pixel may receive an electrical signal representing image data and output an optical signal corresponding to the received electrical signal. As such, one image may be displayed on the display panel 142 by combining optical signals output from a plurality of pixels.

The display panel 142 may use a liquid crystal display (LCD) panel, a light emitting diode (LED) panel, an organic light emitting diode (OLED), a plasma display panel (PDP), a field emission display (FED) panel, and the like. However, the display panel 142 is not limited thereto, and the display panel 142 may use various display means capable of visually displaying an image corresponding to image data.

The display driver 141 receives image data from the image processor 130 and drives the display panel 142 to display the image corresponding to the received image data.

Specifically, the display driver 141 transmits an electrical signal corresponding to image frame data to each of a plurality of pixels constituting the display panel 142. In particular, the display driver 141 may transmit electrical signals to each pixel in various ways in order to transmit electrical signals to all pixels constituting the display panel 142 within a short period of time.

As such, when the display driver 141 transmits an electrical signal corresponding to image data to each pixel constituting the display panel 142, each of the pixels outputs an optical signal corresponding to the received electrical signal, and the optical signal output from each of the pixels is combined to display one image on the display panel 142.

The audio outputter 150 includes an audio amplifier 151 for amplifying sound and a speaker 152 for acoustically outputting the amplified sound.

The audio amplifier 151 may amplify an electrical acoustic signal processed by the image processor 130. The audio amplifier 151 may include a vacuum tube or a transistor for amplifying the electrical sound signal.

The speaker 152 may convert the electrical sound signal output by the audio amplifier 151 into acoustic sound. For example, the speaker 152 may include a thin film that vibrates according to an electrical acoustic signal, and sound (sound waves) may be generated by the vibration of the thin film.

The controller 160 may control the content receiver 120, the image processor 130, the image display 140 and the audio outputter 150 according to the user input and/or the operating state of the display apparatus 100. For example, when a content source is selected, the controller 160 may control the image processor 130 to perform image processing on the content from the selected content source. In addition, when a broadcast channel is selected, the controller 160 may control the content receiver 120 to receive the broadcast signal of the selected channel.

The controller 160 may include a microcontroller 161 that generates a control signal according to the user input and/or the operating state of the display apparatus 100.

The microcontroller 161 includes an arithmetic circuit (ALU) that performs logical operations and arithmetic operations, and a memory circuit (S-RAM, D-RAM, etc.) that stores the calculated data, and stores in Non-volatile memory such as and ROM, IPROM, IPROM, flash memory, and the like.

The microcontroller 161 may generate a content selection signal for selecting a content source according to the user input, and may transmit the content selection signal to the image processor 130. In response to the content selection signal, the image processor 130 may select one of a video signal and an audio signal output from the content receiver 120, and decode the selected video signal and audio signal.

The microcontroller 161 may generate a channel selection signal for selecting a broadcast channel according to the user input, and may transmit the channel selection signal to the content receiver 120. In response to the channel selection signal, the content receiver 120 may control the tuner 122 to extract a signal of a channel selected by the user among a plurality of broadcast signals.

The microcontroller 161 may generate an image adjustment signal for adjusting the brightness, contrast, sharpness, color, etc. of the image according to the user input, and may transmit the image adjustment signal to the image display 140. In response to the image adjustment signal, the image display 140 may adjust the brightness, contrast, sharpness, and color of the image displayed by the display panel 142.

In addition, the microcontroller 161 may generate a volume control signal for adjusting the volume of the sound according to the user input, and may transmit the volume control signal to the audio outputter 150. In response to the volume control signal, the audio outputter 150 may adjust the volume of the sound output from the speaker 152.

In this way, the display apparatus 100 may receive content from the various content sources 1-5 through the various input terminals 121 and the tuner 122, and receive an image based on the received content, display image and output sound.

In addition, the display apparatus 100 includes the analog front end 136 for converting analog signals (video signals and audio signals) received through the input terminals 121 and the tuner 122 into digital signals. The analog front end 136 may include a plurality of the analog-to-digital converters.

The conventional analog front end includes a number of the analog-to-digital converters equal to the sum of the number of the input terminals and the number of outputs of the tuner. Therefore, the number of the analog-to-digital converters is increased each time a new input terminal is added.

In order to minimize the number of the analog-to-digital converters, the analog-to-digital converter included in the display apparatus 100 according to an embodiment may selectively receive analog video signals and audio signals selectively from a plurality of the input terminals 121 and the tuner 122. For example, the plurality of input terminals 121 and the tuner 122 are connected to one or more of the analog-to-digital converters, and a video signal and an audio signal output from any one of the plurality of input terminals 121 and the tuner 122 according to the user input may be provided to the analog-to-digital converter.

Hereinafter, the structures of the content receiver 120 and the image processor 130 for minimizing the number of the analog-to-digital converters are described.

Figure 4:
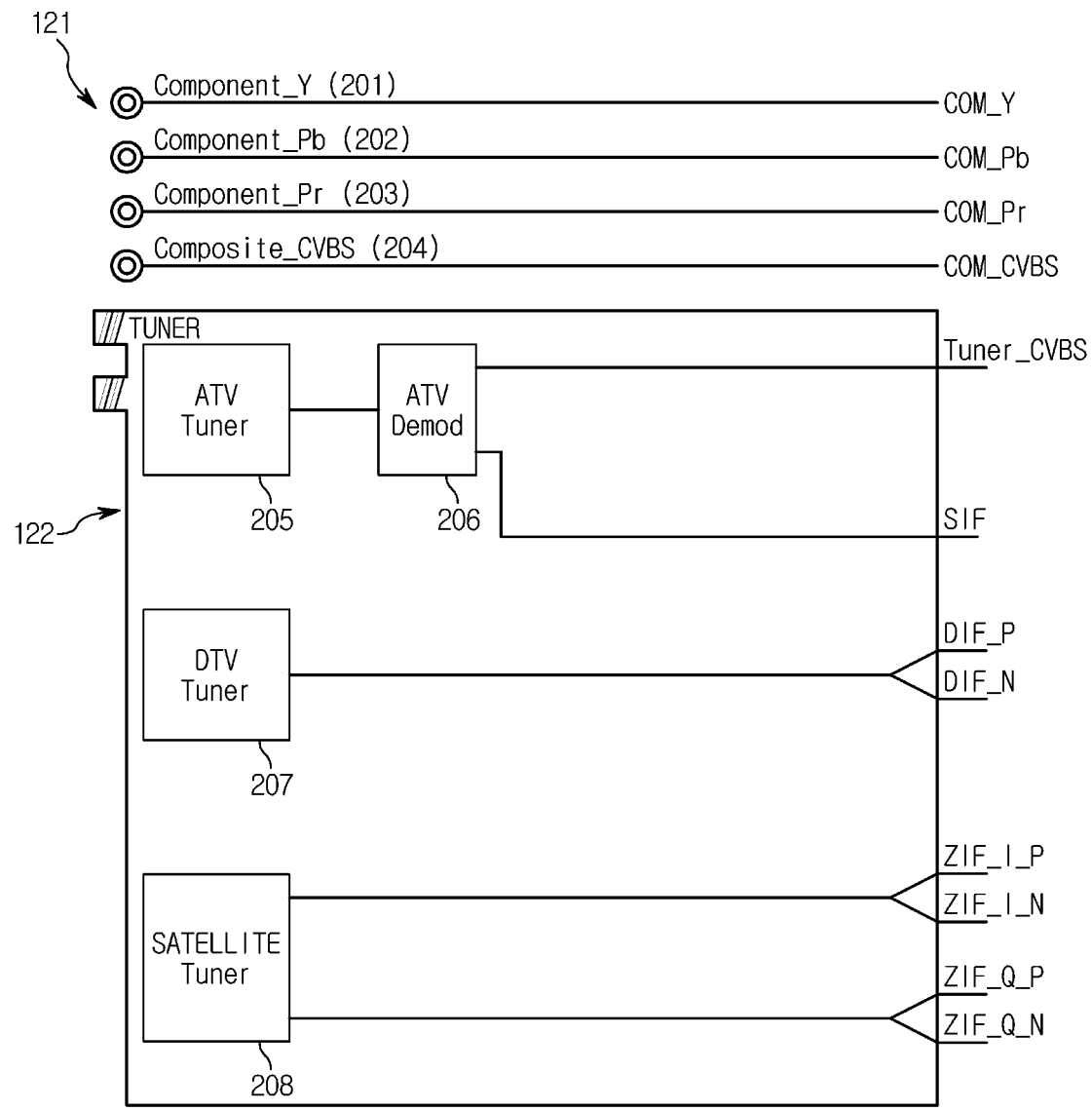
FIG. 4 shows an example of a content receiver included in a display apparatus according to an embodiment.

FIG. 4 shows an example of a content receiver included in a display apparatus according to an embodiment.

Referring to FIG. 4, the content receiver 120 includes the input terminals 121 and the tuner 122.

The input terminals 121 may include a first component terminal 201, a second component terminal 202, a third component terminal 203, and a composite terminal 204.

The first component terminal 201, the second component terminal 202, and the third component terminal 203 may receive image information representing one image. In other words, one image is obtained and formed by combining the image information received through the first component terminal 201, the image information received through the second component terminal 202 and the image information received through the third component terminal 203.

For example, the first component terminal 201, the second component terminal 202 and the third component terminal 203 may receive an RGB signal.

The first component terminal 201 may receive red image information R, the second component terminal 202 may receive green image information G, and the third component terminal 203 may receive blue image information B.

Also, as another example, the first component terminal 201, the second component terminal 202, and the third component terminal 203 may receive YPbPr component video signals COM_Y, COM_Pb, and COM_Pr. The first component terminal 201 receives brightness or luminance (Y) of the image, the second component terminal 202 receives a difference Pb between blue brightness of the image and the overall brightness of the image, and the third component terminal 203 may receive a difference Pr between red brightness of the image and the total brightness of the image.

A combination COM_Pr of Y component video signal COM_Y and Pb component video signal COM_Pb and Pr component video signal received through the first component terminal 201, the second component terminal 202 and the third component terminal 203 may form a one image.

The YPbPr component video signals COM_Y, COM_Pb, and COM_Pr received through the first component terminal 201, the second component terminal 202, and the third component terminal 203 may each include analog image information. An AC component (signal component whose frequency is not '0') and a DC component (signal component whose frequency is '0') of the YPbPr component video signals COM_Y, COM_Pb, and COM_Pr may each include image information. Also, each of the YPbPr component video signals COM_Y, COM_Pb, and COM_Pr may be single-ended signals.

The YPbPr component video signals COM_Y, COM_Pb, and COM_Pr received through the first component terminal 201, the second component terminal 202, and the third component terminal 203 may be output to the image processor 130.

The composite terminal 204 may receive image information representing one image by itself. In other words, one image may be formed by the image information received through the composite terminal 204.

For example, a composite video signal (Composite Video Blanking and Sync, CVBS) COM_CVBS may be received through the composite terminal 204. The composite video signal COM_CVBS includes a luminance signal representing brightness and a color signal representing color, and an image can be reconstructed only from the composite video signal COM_CVBS.

The composite video signal COM_CVBS received through the composite terminal 204 may include analog image information. In other words, the magnitude (magnitude) of the composite video signal COM_CVBS may include image information. Each of the AC component and the DC component of the composite video signal COM_CVBS may include image information. Also, the composite video signal COM_CVBS may be a single-ended signal.

The composite video signal COM_CVBS received through the composite terminal 204 may be output to the image processor 130.

The tuner 122 may include an analog broadcast tuner 205, an analog broadcast demodulator 206, a digital broadcast tuner 207, and a satellite broadcast tuner 208. In addition, the analog broadcast tuner 205, the analog broadcast demodulator 206, the digital broadcast tuner 207, and the satellite broadcast tuner 208 may be integrally manufactured.

The analog broadcast tuner 205 may receive an analog broadcast signal from the broadcast receiving antenna 1 or the wired cable 2, and extract a broadcast signal of a channel selected by the user from among the analog broadcast signals. For example, the analog broadcast tuner 205 may include a filter that passes a broadcast signal having a frequency corresponding to a selected channel and blocks the broadcast signals of other frequencies.

In addition, the analog broadcast tuner 205 may convert the extracted broadcast signal into an analog broadcast signal of an intermediate frequency (IF). For example, the analog broadcast tuner 205 may include a mixer that lowers the frequency of the broadcast signal to an intermediate frequency.

The analog broadcast demodulator 206 can demodulate an analog intermediate frequency broadcast signal. For example, the analog broadcast demodulator 206 may demodulate an analog intermediate frequency broadcast signal and output an analog broadcast video signal Tuner_CVBS and an analog broadcast audio signal SIF.

The analog broadcast video signal Tuner_CVBS may be a signal in CVBS format. In other words, the analog broadcast video signal Tuner_CVBS includes a luminance signal indicating brightness and a color signal indicating color, and an image can be restored from only the analog broadcast video signal Tuner_CVBS.

The analog broadcast video signal Tuner_CVBS may include analog video information and may be a single-ended signal. In addition, the AC component and the DC component of the analog broadcast video signal Tuner_CVBS may each include video information. For example, the analog broadcast video signal Tuner_CVBS may be a signal having a bandwidth of approximately 6 MHz (mega-hertz) from '0' (direct current).

The analog broadcast audio signal SIF may be a sound intermediate frequency (SIF) signal. The analog broadcast audio signal SIF may include analog sound information. In addition, the analog broadcast audio signal SIF may be a single-ended signal, and the AC component and the DC component may each include sound information.

The digital broadcast tuner 207 may receive a digital broadcast signal from the broadcast receiving antenna 1 or the wired cable 2, and extract a broadcast signal of a channel selected by the user from among the digital broadcast signals. For example, the digital broadcast tuner 207 may include a filter that passes a broadcast signal having a frequency corresponding to a selected channel and blocks the broadcast signals of other frequencies.

In addition, the digital broadcast tuner 207 may convert the extracted broadcast signal into an intermediate frequency broadcast signal. For example, the digital broadcast tuner 207 may include a mixer that lowers the frequency of the broadcast signal to an intermediate frequency.

A digital intermediate frequency signal (Digital Intermediate Frequency, DIF) (hereinafter referred to as 'digital intermediate frequency signal') has a form of an analog signal, but may include digital image information. Specifically, when the digital intermediate frequency signal DIF is converted to a baseband signal and the baseband signal is demodulated, digital image information having '0' and '1' may be restored.

The digital intermediate frequency signal DIF of the digital broadcast signal may be a differential signal. For example, the digital intermediate frequency signal DIF may include a positive digital intermediate frequency signal DIF_P and a negative digital intermediate frequency signal DIF_N.

In addition, only the AC component of the digital intermediate frequency signal DIF includes image information, and the DC component of the digital intermediate frequency signal DIF may not include image information. For example, the digital intermediate frequency signal DIF may be a signal having a bandwidth of about 6 MHz (mega-hertz) around 5 MHz (mega-hertz).

The satellite broadcast tuner 208 may receive a satellite digital broadcast signal from the satellite antenna 3 and extract a broadcast signal of a channel selected by the user from among the satellite digital broadcast signals. For example, the satellite broadcast tuner 208 may include a filter that passes a broadcast signal having a frequency corresponding to a selected channel and blocks the broadcast signals of other frequencies.

In addition, the satellite broadcast tuner 208 may convert the extracted broadcast signal into a baseband broadcast signal. For example, the satellite broadcast tuner 208 may include a mixer that lowers the frequency of the broadcast signal to baseband.

As such, the satellite broadcast tuner 208 does not use an intermediate frequency signal, unlike the digital broadcast tuner 207, and can directly convert the broadcast signal to a baseband signal.

This is because the frequency band per channel of the satellite TV broadcast signal is wider than the frequency band per channel of the digital TV broadcast signal. For example, a frequency band per channel of a digital TV broadcast signal may be approximately 6 MHz (mega-hertz). In contrast, the frequency band per channel of the satellite TV broadcast signal may be approximately 45 MHz (mega-hertz).

As described above, it is difficult to process a signal of a broadcast signal due to a wide frequency band per channel of the satellite TV broadcast signal. Accordingly, the satellite broadcast tuner 208 may convert the extracted broadcast signal into a signal having a bandwidth of approximately 45 MHz (mega-hertz) with '0' as the center frequency.

As a result, the satellite broadcast tuner 208 can output a signal having a bandwidth (positive frequency) of 22.5 MHz (mega-hertz). On the other hand, in order to output a signal having a different 22.5 MHz (mega-hertz) bandwidth (negative frequency), the satellite broadcast tuner 208 may output an I (imaginary) signal and a Q (quadratic) signal. In other words, the tuner 122 has an I signal ZIF_I having a bandwidth of 22.5 MHz (mega-hertz) (hereinafter referred to as 'zero intermediate frequency I signal') and a Q signal ZIF_Q (hereinafter referred to as 'zero intermediate frequency Q').

The zero intermediate frequency I signal ZIF_I and the zero intermediate frequency Q signal ZIF_Q have a form of an analog signal, but may include digital image information. Specifically, when demodulating the zero intermediate frequency I signal ZIF_I and the zero intermediate frequency Q signal ZIF_Q, digital image information having '0' and '1' may be restored.

The zero intermediate frequency I signal ZIF_I and the zero intermediate frequency Q signal ZIF_Q may be differential signals. For example, the zero intermediate frequency I signal ZIF_I may include a positive zero intermediate frequency I signal ZIF_I P and a negative zero intermediate frequency I signal ZIF_I N. The zero intermediate frequency Q signal ZIF_Q may include a positive zero intermediate frequency Q signal ZIF_Q_P and a negative zero intermediate frequency Q signal ZIF_Q_N.

In addition, the zero intermediate frequency I signal ZIF_I and the zero intermediate frequency Q signal ZIF_Q each contain only the AC component image information, and the DC component may not include image information.

The tuner 122 receives an analog broadcast signal, a digital broadcast signal and/or a satellite digital broadcast signal, and outputs the analog broadcast video signal Tuner_CVBS, the analog broadcast audio signal SIF, the digital intermediate frequency signal DIF, the zero intermediate frequency I signal ZIF_I and/or the zero intermediate frequency Q signal ZIF_Q.

As such, the content receiver 120 may receive image information from the various content sources 1-5 and output video signals and/or audio signals in various formats. For example, the content receiver 120 may output three of the YPbPr component video signals COM_Y, COM_Pb, and COM_Pr, the composite video signal COM_CVBS, the analog broadcast video signal Tuner_CVBS, the analog broadcast audio signal SIF, and the digital intermediate frequency signals DIF_P and DIF_N, the zero intermediate frequency I signals ZIF_I_P and ZIF_I_N, and the zero intermediate frequency Q signals ZIF_Q_P and ZIF_Q_N.

However, the video signal and/or audio signal output from the content receiver 120 is not limited thereto, and may further include a video signal received through the HDMI terminal and a video signal received through the USB terminal.

Figure 5:
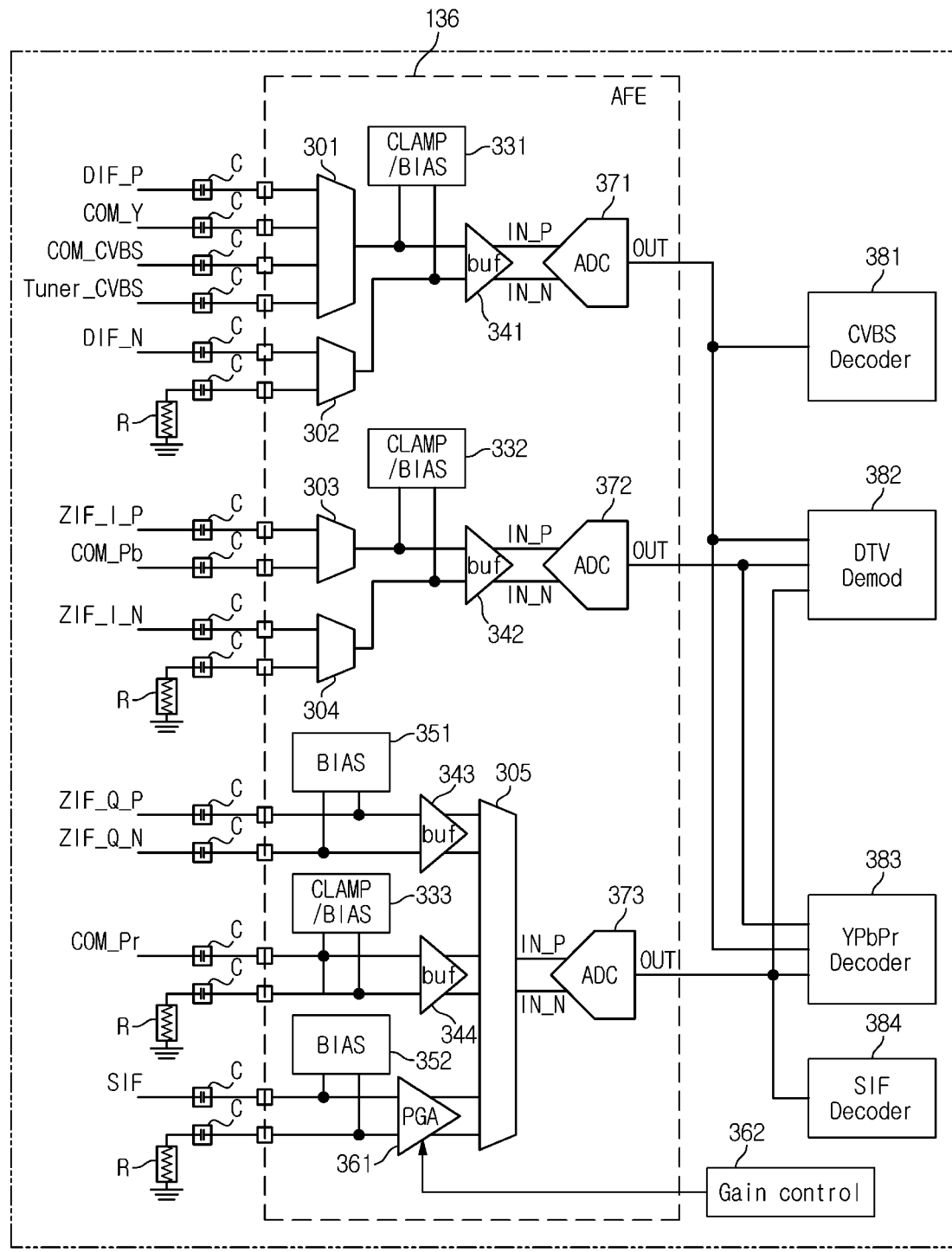
FIG. 5 shows an example of an image processor receiving a signal from the content receiver shown in FIG. 4.

FIG. 5 shows an example of an image processor receiving a signal from the content receiver shown in FIG. 4.

The image processor 130 may receive a plurality of signals output from the content receiver 120 shown in FIG. 4 and process the received plurality of signals.

As shown in FIG. 5, the image processor 130 includes the analog front end 136 that converts signals (video signals and audio signals) outputted from the content receiver 120 into digital signals (or digital codes), and a CVBS decoder 381/a digital broadcast demodulator 382/a YPbPr decoder 383/a SIF decoder 384 to process the digital signals.

The analog front end 136 includes a first analog-to-digital converter 371, a second analog-to-digital converter 372, and a third analog-to-digital converter 373.

The first analog-to-digital converter 371, the second analog-to-digital converter 372, and the third analog-to-digital converter 373 each have a positive input terminal IN_P to which a positive signal is input and a negative input terminal IN_N to which a negative signal is input, and includes an output terminal OUT for outputting a digital code corresponding to the difference between the positive signal and the negative signal.

To process three or more of the input signals COM_Y, COM_Pb, COM_Pr, COM_CVBS, Tuner_CVBS, SIF, DIF, ZIF_I, and ZIF_Q by the three analog-to-digital converters 371, 372, and 373, the input signals COM_Y, COM_Pb, COM_Pr, COM_CVBS, Tuner CVBS, SIF, DIF, ZIF_I, and ZIF_Q may be appropriately distributed to the first, second, and third analog-to-digital converters 371, 372, and 373. For example, three of the YPbPr component video signals COM_Y, COM_Pb, and COM_Pr are distributed to the first, second, and third analog-to-digital converters 371, 372, and 373, respectively. The digital broadcast signals DIF, ZIF_I, and ZIF_Q are also distributed to the first, second, and third analog-to-digital converters 371, 372, 373, respectively. The remaining signals COM_CVBS, Tuner CVBS, and SIF may be appropriately distributed to the first, second, and third analog-to-digital converters 371, 372, and 373.

In addition, the analog front end 136 may include a plurality of multiplexers so that the analog-to-digital converters 371, 372, and 373 can process a plurality of input signals.

For example, the analog front end 136 includes a first multiplexer 301, a second multiplexer 302, a third multiplexer 303, a fourth multiplexer 304 and a fifth multiplexer 305.

The first multiplexer 301 may be a 4*1 multiplexer that receives four signals and outputs one signal. The first multiplexer 301 may output any one of the positive digital intermediate frequency signal DIF_P, the Y component video signal COM_Y, the composite video signal COM_CVBS, and the analog broadcast video signal Tuner_CVBS according to the content selection signal of the controller 160.

The positive digital intermediate frequency signal DIF_P, the Y component video signal COM_Y, the composite video signal COM_CVBS, and the analog broadcast video signal Tuner_CVBS can be input to the first multiplexer 301 through an input capacitor C. The input signals DIF_N, COM_Y, COM_CVBS, and Tuner_CVBS of the first multiplexer 301 may be AC coupled, the DC components of the input signals DIF_N, COM_Y, COM_CVBS, and Tuner_CVBS of the first multiplexer 301 may be removed and the AC components may be input to the first multiplexer 301.

The first multiplexer 301 may output any one of the positive digital intermediate frequency signal DIF_N, the Y component video signal COM_Y, the composite video signal COM_CVBS, and the analog broadcast video signal Tuner_CVBS according to the content selection signal of the controller 160 to the positive input terminal IN_P of the first analog-to-digital converter 371. For example, when digital TV broadcasting is selected, the first multiplexer 301 outputs the positive digital intermediate frequency signal DIF_P. When the content source of the component terminals 201, 202, and 203 is selected, the first multiplexer 301 may output the Y component video signal COM_Y. In addition, when the content source of the composite terminal 204 is selected, the first multiplexer 301 outputs the composite video signal COM_CVBS, and when analog TV broadcasting is selected, the first multiplexer 301 may output the analog broadcasting video signal Tuner_CVBS.

The second multiplexer 302 may be a 2×1 multiplexer that receives two signals and outputs one signal. The second multiplexer 302 may output one of the negative digital intermediate frequency signal DIF_N and a 'ground signal' according to the content selection signal of the controller 160.

Any one of the two inputs of the second multiplexer 302 may be connected to the 'ground signal' through a resistor R, and the negative digital intermediate frequency signal DIF_N may be input to the other of the two inputs of the second multiplexer 302 through the input capacitor C.

The second multiplexer 302 may output one of the negative digital intermediate frequency signal DIF_N and the 'ground signal' according to the content selection signal of the controller 160 to the negative input terminal IN_N of the first analog-to-digital converter 371. The Y component video signal COM_Y, the composite video signal COM_CVBS, and the analog broadcast video signal Tuner_CVBS are single-ended signals. In other words, the Y component video signal COM_Y, the composite video signal COM_CVBS, and the analog broadcast video signal Tuner_CVBS may be transmitted through a single signal line. Accordingly, when the content source of the component terminals 201, 202, and 203 or the content source of the composite terminal 204 or analog TV broadcasting is selected, the second multiplexer 302 may output the 'ground signal.' When digital TV broadcasting is selected, the second multiplexer 302 may output the negative digital intermediate frequency signal DIF_N.

If necessary, the second multiplexer 302 may be omitted. For example, the second multiplexer 302 may be replaced with a switch that passes or blocks the negative digital intermediate frequency signal DIF_N. For example, when digital TV broadcasting is selected, the switch is closed (turned on) to pass the negative digital intermediate frequency signal DIF_N, and when the digital TV broadcasting is not selected, the switch may be opened (turned off) to block the negative digital intermediate frequency signal DIF_N.

The output of the first multiplexer 301 and the output of the second multiplexer 302 may be respectively connected to the output of a first clamping/biasing circuit 331. The first clamping/biasing circuit 331 may be a circuit in which a clamping circuit for clamping a signal and a biasing circuit for direct-biasing a signal are integrated.

The Y component video signal COM_Y, the composite video signal COM_CVBS, and the analog broadcast video signal Tuner_CVBS are single-ended signals, and may include video information in both the AC components and the DC components. The DC components of the Y component video signal COM_Y, the composite video signal COM_CVBS, and the analog broadcast video signal Tuner_CVBS are removed by AC coupling. Accordingly, the first clamping/biasing circuit 331 to restore the DC component of the signals COM_Y, COM_CVBS, and Tuner_CVBS, the Y component video signal COM_Y output from the content receiver 120 or the composite video signal COM_CVBS or the output of the first multiplexer 301 may be clamped according to the analog broadcast video signal Tuner_CVBS.

On the other hand, the positive digital intermediate frequency signal DIF_P and the negative digital intermediate frequency signal DIF_N are differential signals, and only the AC component may include image information. The DC component of the positive digital intermediate frequency signal DIF_P and the negative digital intermediate frequency signal DIF_N may be removed by AC coupling. The DC component of the differential signal does not need to be restored, but the differential signal may be distorted by removing the DC component.

The first clamping/biasing circuit 331 may output a biasing voltage having a predetermined size to prevent distortion of the positive digital intermediate frequency signal DIF_P and the negative digital intermediate frequency signal DIF_N. In other words, when the digital intermediate frequency signals DIF_P and DIF_N are output from the first and second multiplexers 301 and 302, the first clamping/biasing circuit 331 may distort the outputs of the first and second multiplexers 301 and 302 with a predetermined biasing voltage.

As such, the first clamping/biasing circuit 331 clamps the output of the first multiplexer 301 or biases the output of the first and second multiplexers 301 and 302 depending on the Y component video signal COM_Y, the composite video signal COM_CVBS or the analog broadcast video signal Tuner_CVBS.

The output of the first multiplexer 301 and the output of the second multiplexer 302 may be input to a first buffer 341. The first buffer 341 removes the noise of the output of the first multiplexer 301 and the output of the second multiplexer 302, and amplifies the current so that the first analog-to-digital converter 371 smoothly performs analog-to-digital conversion.

The first analog-to-digital converter 371 receives the output of the first multiplexer 301 and the output of the second multiplexer 302 through the first buffer 341, and converts the difference (analog signal) between the output of the first multiplexer 301 and the output of the second multiplexer 302 into a digital signal (digital code).

The output of the first analog-to-digital converter 371 may be input to the CVBS decoder 381 that decodes a CVBS type signal, the digital broadcast demodulator 382 that demodulates a digital TV broadcast signal, and the YPbPr decoder 383 that decodes a YPbPb component video signal.

One of the CVBS decoder 381, the digital broadcast demodulator 382, and the YPbPr decoder 383 may be activated according to the content selection signal of the controller 160. For example, when digital TV broadcasting is selected, the digital broadcast demodulator 382 demodulates the output of the first analog-to-digital converter 371, and when the composite terminal is selected, the CVBS decoder 381 may decode the output of the first analog-to-digital converter 371. In addition, when the component terminal is selected, the YPbPr decoder 383 decodes the output of the first analog-to-digital converter 371, and when analog TV broadcasting is selected, the CVBS decoder 381 may decode the output of the first analog-to-digital converter 371.

The third multiplexer 303 may be a 2×1 multiplexer that receives two signals and outputs one signal. The third multiplexer 303 may output one of the positive zero intermediate frequency I signal ZIF_I_P and the Pb component video signal COM_Pb according to the content selection signal of the controller 160.

The positive zero intermediate frequency I signal ZIF_I_P and the Pb component video signal COM_Pb may be AC coupled through the input capacitor C and be input to the third multiplexer 303.

The third multiplexer 303 may output either the positive zero intermediate frequency I signal ZIF_I_P or the Pb component video signal COM Pb to the positive input terminal IN_P of the second analog-to-digital converter 372 according to the content selection signal of the controller 160. For example, when satellite digital TV broadcasting is selected, the third multiplexer 303 outputs the positive zero intermediate frequency I signal ZIF_I_P, and when the component terminal is selected, the third multiplexer 303 displays the Pb component video signal COM_Pb.

The fourth multiplexer 304 may be a 2×1 multiplexer that receives two signals and outputs one signal. The fourth multiplexer 304 may output one of the negative zero intermediate frequency I signal ZIF_I_N and the 'ground signal' according to the content selection signal of the controller 160.

Any one of the two inputs of the fourth multiplexer 304 may be connected to the 'ground signal' through the resistor R, and the negative zero intermediate frequency I signal ZIF_I_N may be input through the input capacitor C.

The fourth multiplexer 304 may select one of the negative zero intermediate frequency I signal ZIF_I_N and the 'ground signal' according to the content selection signal of the controller 160 as the negative input terminal INN of the second analog-to-digital converter 372. Since the Pb component video signal COM_Pb is a single-ended signal, when the content source of the component terminals 201, 202, and 203 is selected, the fourth multiplexer 304 may output the 'ground signal.' In addition, when satellite digital TV broadcasting is selected, the fourth multiplexer 304 may output the negative zero intermediate frequency I signal ZIF_I_N.

If necessary, the fourth multiplexer 304 may be omitted. For example, the fourth multiplexer 304 may be replaced with a switch that passes or blocks the negative zero intermediate frequency I signal ZIF_I_N. For example, if satellite digital TV broadcasting is selected, the switch is closed (turned on) to pass the negative zero intermediate frequency I signal ZIF_I_N, and if satellite digital TV broadcasting is not selected, the switch may be opened (turned off) to block the negative zero intermediate frequency I signal ZIF_I_N.

The output of the third multiplexer 303 and the output of the fourth multiplexer 304 may be connected to a second clamping/biasing circuit 332. The second clamping/biasing circuit 332 may clamp or bias the output of the third multiplexer 303 and the output of the fourth multiplexer 304.

When the Pb component video signal COM_Pb is output from the third multiplexer 303, to restore the DC component of the Pb component video signal COM_Pb, the second clamping/biasing circuit 332 may clamp the output of the third multiplexer 303 according to the Pb component video signal COM_Pb output from the content receiver 120.

When the zero intermediate frequency I signals ZIF_I_P and ZIF_I_N are output from the third and fourth multiplexers 303 and 304, the second clamping/biasing circuit 332 to prevent distortion of the zero intermediate frequency I signals ZIF_I_P and ZIF_I_N may bias the outputs of the third and fourth multiplexers 303 and 304. For example, the second clamping/biasing circuit 332 may output a biasing voltage of a predetermined size.

As such, the second clamping/biasing circuit 332 clamps the outputs of the third multiplexer 303 according to the Pb component video signal COM_Pb, or biases the outputs of the third and fourth multiplexers 303 and 304.

The output of the third multiplexer 303 and the output of the fourth multiplexer 304 may be input to a second buffer 342. The output currents of the third multiplexer 303 and the fourth multiplexer 304 may be amplified by the second buffer 342.

The second analog-to-digital converter 372 receives the output of the third multiplexer 303 and the output of the fourth multiplexer 304 passing through the second buffer 342, and converts the difference between the output of the first multiplexer 301 and the output of the second multiplexer 302 (analog signal) into a digital signal (digital code).

The output of the second analog-to-digital converter 372 may be input to the digital broadcast demodulator 382 for demodulating the digital TV broadcast signal and the YPbPr decoder 383 for decoding the YPbPb component video signal.

One of the digital broadcast demodulator 382 and the YPbPr decoder 383 may be activated according to the content selection signal of the controller 160. For example, when satellite digital TV broadcasting is selected, the digital broadcast demodulator 382 demodulates the output of the second analog-to-digital converter 372, and when the component terminal is selected, the YPbPr decoder 383 can decode the output of the second analog-to-digital converter 372.

The fifth multiplexer 305 may be a 6*2 multiplexer that receives six signals and outputs two signals. The fifth multiplexer 305 may multiplex a pair of the positive zero intermediate frequency Q signal ZIF_Q_P and the negative zero intermediate frequency Q signal ZIF_Q_N, a pair of Pr component of the third component terminal 203 and the 'ground signal,' and a pair of the analog broadcast audio signal SIF and the 'ground signal' according to the content selection signal of the controller 160. In other words, the fifth multiplexer 305 may output any one pair of signals among the three pairs of input signals.

Since the zero intermediate frequency Q signals ZIF_Q_P and ZIF_Q_N are differential signals, the positive zero intermediate frequency Q signal ZIF_Q_P and the negative zero intermediate frequency Q signal ZIF_Q_N can form a pair of signals.

The positive zero intermediate frequency Q signal ZIF_Q_P and the negative zero intermediate frequency Q signal ZIF_Q_N may be AC coupled through the input capacitor C, respectively, and be input to the fifth multiplexer 305. Further, the positive zero intermediate frequency Q signal ZIF_Q_P and the negative zero intermediate frequency Q signal ZIF_Q_N may be DC-biased by a first biasing circuit 351 before being input to the fifth multiplexer 305, respectively.

The first biasing circuit 351 outputs a biasing voltage having a predetermined size to prevent distortion of the positive zero intermediate frequency Q signal ZIF_Q_P and the negative zero intermediate frequency Q signal ZIF_Q_N due to AC coupling. In other words, the first biasing circuit 351 may bias the AC coupled zero intermediate frequency Q signal ZIF_Q.

The positive zero intermediate frequency Q signal ZIF_Q_P and the negative zero intermediate frequency Q signal ZIF_Q_N biased by the first biasing circuit 351 may be input to a third buffer 343, and the output of the third buffer 343 may be input to the fifth multiplexer 305.

Since the Pr component video signal COM_Pr is a single-ended signal, the Pr component video signal COM_Pr may form a signal pair with the 'ground signal.'

The Pr component video signal COM_Pr and the 'ground signal' may be AC coupled through the input capacitor C, respectively, and be input to the fifth multiplexer 305. Further, the Pr component video signal COM_Pr and the 'ground signal' may be clamped by a third clamping/biasing circuit 333 before being input to the fifth multiplexer 305, respectively.

To recover the omission of the DC component of the Pr component video signal COM_Pr by AC coupling, the third clamping/biasing circuit 333 may clamp the AC coupled Pr component video signal COM_Pr according to the size of the Pr component video signal COM_Pr output from the content receiver 120.

The Pr component video signal COM Pr and the 'ground' signal may be input to a fourth buffer 344 and the output of the fourth buffer 344 may be input to the fifth multiplexer 305.

Since the analog broadcast audio signal SIF is a single-ended signal, the analog broadcast audio signal SIF can form a signal pair with the 'ground signal.'

The analog broadcast audio signal SIF and the 'ground signal' may be AC-coupled through the input capacitor C, respectively, and be input to the fifth multiplexer 305. Also, the analog broadcast audio signal SIF and the 'ground signal' may be biased by a second biasing circuit 352 before being input to the fifth multiplexer 305, respectively.

The second biasing circuit 352 may output a biasing voltage of a predetermined size to prevent distortion of the analog broadcast audio signal SIF. In other words, the second biasing circuit 352 may bias the analog broadcast audio signal SIF.

The analog broadcast audio signal SIF and the 'ground signal' may be input to an analog programmable gain amplifier circuit 361. The analog PGA circuit 361 amplifies the input signal and outputs the amplified signal, and the amplification factor of the analog PGA circuit 361 may be changed according to the gain control signal of a gain controller 362. The gain controller 362 may adjust the amplification factor of the analog PGA circuit 361 according to the size of the analog broadcast audio signal SIF.

The analog broadcast audio signal SIF amplified by the analog PGA circuit 361 may be input to the fifth multiplexer 305.

The fifth multiplexer 305 may output any one pair of a pair of the zero intermediate frequency Q signals ZIF_Q_P and ZIF_Q_N and a pair of the Pr component video signals (COM_Pr, and a pair of the analog broadcast audio signals SIF into the positive/negative input terminals IN_P and IN_N of the third analog-to-digital converter 373. For example, when satellite digital TV broadcasting is selected, the fifth multiplexer 305 outputs a pair of the zero intermediate frequency Q signals ZIF_Q_P and ZIF_Q_N, and when the content source of the component terminals 201, 202, and 203 is selected, the fifth multiplexer 305 may output a pair of the Pr component video signals COM_Pr. In addition, when analog TV broadcasting is selected, the fifth multiplexer 305 may output a pair of the analog broadcasting audio signals SIF.

The third analog-to-digital converter 373 may receive the output of the fifth multiplexer 305 and convert the output of the fifth multiplexer 305 into a digital signal (digital code).

The output of the third analog-to-digital converter 373 may be connected to the digital broadcast demodulator 382 that demodulates a digital TV broadcast signal, the YPbPr decoder 383 that decodes a YPbPb component video signal, and the SIF decoder 384 that decodes the analog broadcast audio signal SIF.

One of the digital broadcast demodulator 382, the YPbPr decoder 383, and the SIF decoder 384 may be activated according to the content selection signal of the controller 160. For example, when satellite digital TV broadcasting is selected, the digital broadcast demodulator 382 demodulates the output of the third analog-to-digital converter 373, and when the component terminal is selected, the YPbPr decoder 383 may decode the output of the third analog-to-digital converter 373. Also, if analog TV broadcasting is selected, the SIF decoder 384 can decode the output of the third analog-to-digital converter 373.

As described above, the analog front end 136 may be input to the YPbPr component video signals COM_Y, COM_Pb, and COM_Pr, the composite video signal COM_CVBS, the analog broadcast video signal Tuner CVBS, the analog broadcast audio signal SIF, the digital intermediate frequency signals DIF_P and DIF_N, the zero intermediate frequency I signals ZIF_I_P and ZIF_I_N and the zero intermediate frequency Q signals ZIF_Q_P and ZIF_Q_N. In other words, nine signals may be input to the analog front end 136.

Each of the signals can be AC coupled with the analog front end 136 and can be clamped or biased by a clamping/biasing circuit.

The analog front end 136 may include three analog-to-digital converters. The YPbPr component video signals COM_Y, COM_Pb, and COM_Pr are distributed to three analog-to-digital converters, and the digital intermediate frequency signals DIF_P and DIF_N, the zero intermediate frequency I signals ZIF_I_P and ZIF_I_N and the zero intermediate frequency Q signals ZIF_Q_P and ZIF_Q_N may be distributed, respectively. In addition, the composite video signal COM_CVBS, the analog broadcast video signal Tuner_CVBS, and the analog broadcast audio signal SIF may be distributed to the three analog-to-digital converters, respectively.

Any one of the signals distributed to the respective analog-to-digital converters may be selected by the multiplexer, and the signal selected by the multiplexer may be converted into a digital signal (digital code) by the analog-to-digital converter.

In addition, the YPbPr component video signals COM_Y, COM_Pb, and COM_Pr, the composite video signal COM_CVBS, and the analog broadcast video signal Tuner_CVBS are single-ended signals, and include video information in both the AC and DC components. Since each of the signals is AC coupled with the analog front end 136, clamping is required for the YPbPr component video signals COM_Y, COM_Pb, and COM_Pr, the composite video signal COM_CVBS, and the analog broadcast video signal Tuner CVBS. In addition, the clamping voltage value required for each of the signals COM_Y, COM_Pb, COM_Pr, COM_CVBS, and Tuner CVBS changes according to the size of each of the signals COM_Y, COM_Pb, COM_Pr, COM_CVBS, and Tuner_CVBS.

Therefore, the YPbPr component video signals COM_Y, COM_Pb, and COM_Pr, the composite video signal COM_CVBS, the YPbPr component video signals COM_Y, COM_Pb, and COM_Pr and the analog broadcast video signal Tuner_CVBS are difficult to convert to a digital signal.

Moreover, the digital intermediate frequency signals DIF_P and DIF_N, the zero intermediate frequency I signals ZIF_I_P and ZIF_I_N and the zero intermediate frequency Q signals ZIF_Q_P and ZIF_Q_N include image information only in the AC component.

Therefore, there is significant difficulty in converting all the signals COM_Y, COM_Pb, COM_Pr, COM_CVBS, Tuner_CVBS, SIF, DIF, ZIF_I, and ZIF_Q into digital signals using one analog-to-digital converter. For example, it is difficult to convert the YPbPr component video signals COM_Y, COM_Pb, and COM_Pr, the composite video signal COM_CVBS and the digital intermediate frequency signals DIF_P and DIF_N into digital signals using one analog-to-digital converter. To overcome this, a clamping/biasing circuit can be provided. By selectively clamping or biasing the AC coupled signal by the clamping/biasing circuit, the single-ended signal and the differential signal can be multiplexed by a single multiplexer.

For example, AC coupled YPbPr component video signals COM_Y, COM_Pb, and COM_Pr, the composite video signal COM_CVBS and the digital intermediate frequency signals DIF_P and DIF_N are multiplexed by a single multiplexer and selectively clamped or biased by the clamping/biasing circuit. The clamped or biased signal can be converted to a digital signal by one analog-to-digital converter.

The distribution of signals to the three analog-to-digital converters described above is only one embodiment, and is not limited thereto. For example, the Y component video signal COM_Y, the Pb component video signal COM_Pb, and the Pr component video signal COM_Pr are distributed to the first analog-to-digital converter 371, the second analog-to-digital converter 372 and the third analog-to-digital converter 373, respectively, and the remaining signals are sufficient if the signals are distributed to the first analog-to-digital converter 371, the second analog-to-digital converter 372 and the third analog-to-digital converter 373.

Figure 6:
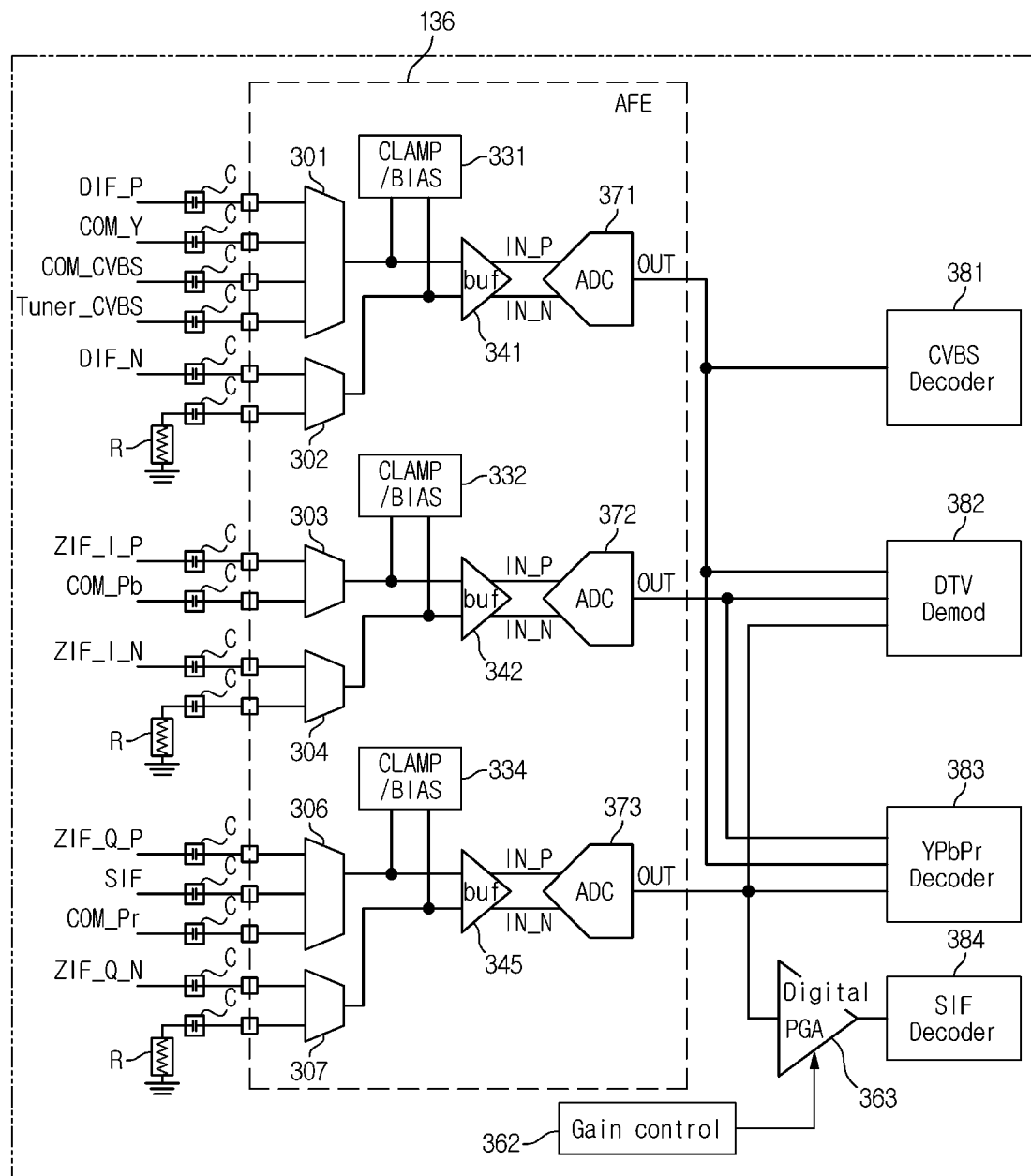
FIG. 6 shows another example of an image processor receiving a signal from the content receiver shown in FIG. 4.

FIG. 6 shows another example of an image processor receiving a signal from the content receiver shown in FIG. 4.

As shown in FIG. 6, the image processor 130 includes the analog front end 136 that converts analog signals (video signals and audio signals) output from the content receiver 120 into digital signals, and the CVBS decoder 381/the digital broadcast demodulator 382/the YPbPr decoder 383/ the SIF decoder 384 that processes the digital signals.

The analog front end 136 includes the first analog-to-digital converter 371, the second analog-to-digital converter 372, and the third analog-to-digital converter 373. In addition, the analog front end 136 includes the first multiplexer 301, the second multiplexer 302, the third multiplexer 303, the fourth multiplexer 304, a sixth multiplexer 306 and a seventh multiplexer 307.

The first analog-to-digital converter 371 and the second analog-to-digital converter 372 may be the same as those shown in FIG. 5. Also, the first multiplexer 301, the second multiplexer 302, the third multiplexer 303, and the fourth multiplexer 304 may be the same as those illustrated in FIG. 5.

The sixth multiplexer 306 may be a 3×1 multiplexer that receives three signals and outputs one signal. The sixth multiplexer 306 may output any one of the positive zero intermediate frequency Q signal ZIF_Q_P, the analog broadcast audio signal SIF, and the Pr component video signal COM_Pr according to the content selection signal of the controller 160.

The positive zero intermediate frequency Q signal ZIF_Q_P, the analog broadcast audio signal SIF, and the Pr component video signal COM_Pr may be input to the sixth multiplexer 306 through the input capacitor C.

The sixth multiplexer 306 may output any one of the positive zero intermediate frequency Q signal ZIF_Q_P, the analog broadcast audio signal SIF, and the Pr component video signal COM_Pr according to the content selection signal of the controller 160 to the positive input terminal IN_P of the third analog-to-digital converter 373. For example, when satellite digital TV broadcasting is selected, the sixth multiplexer 306 outputs the positive zero intermediate frequency Q signal ZIF_Q_P, and when analog broadcasting is selected, the sixth multiplexer 306 receives the analog broadcast audio signal SIF. Also, when the component terminal is selected, the sixth multiplexer 306 may output the Pr component video signal COM_Pr.

The seventh multiplexer 307 may be a 2*1 multiplexer that receives two signals and outputs one signal. The seventh multiplexer 307 may multiplex the negative zero intermediate frequency Q signal ZIF_Q_N and the 'ground signal' of the satellite broadcast tuner 208 according to the content selection signal of the controller 160.

Any one of the two inputs of the seventh multiplexer 307 may be connected to the 'ground signal' through the resistor R, and the other of the two inputs of the seventh multiplexer 307 may be input the negative zero intermediate frequency Q signal ZIF_Q_N via the input capacitor C.

According to the content selection signal of the controller 160, the seventh multiplexer 307 may output one of the negative zero intermediate frequency Q signal ZIF_Q_N and the 'ground signal' to the negative input terminal IN_N of the third analog-to-digital converter 373. Since the Pr component video signal COM_Pr is a single-ended signal, when the component terminal is selected, the seventh multiplexer 307 may output the 'ground signal.' Also, when satellite digital TV broadcasting is selected, the seventh multiplexer 307 may output the negative zero intermediate frequency Q signal ZIF_Q_N.

The output of the sixth multiplexer 306 and the output of the seventh multiplexer 307 may be respectively connected to the output of a fourth clamping/biasing circuit 334. The fourth clamping/biasing circuit 334 may clamp or bias the output of the sixth multiplexer 306 and the output of the seventh multiplexer 307.

When the Pr component video signal COM_Pr is output from the sixth multiplexer 306, to restore the DC component of the Pr component video signal COM_Pr, the fourth clamping/biasing circuit 334 may clamp the output of the sixth multiplexer 306 according to the Pr component video signal COM_Pr output from the content receiver 120. For example, the fourth clamping/biasing circuit 334 may output a biasing voltage of a predetermined size.

As such, the fourth clamping/biasing circuit 334 clamps the output of the seventh multiplexer 307 according to the Pr component video signal COM_Pr, or biases the outputs of the sixth and seventh multiplexers 306 and 307.

The output of the sixth multiplexer 306 and the output of the seventh multiplexer 307 may be input to a fifth buffer 345. The output currents of the sixth multiplexer 306 and the seventh multiplexer 307 may be amplified by the fifth buffer 345.

The third analog-to-digital converter 373 receives the output of the sixth multiplexer 306 and the output of the seventh multiplexer 307 passing through the fifth buffer 345, and converts the difference between the output of the sixth multiplexer 306 and the outputs of the seventh multiplexer 307 (analog signal) into a digital signal (digital code).

The output of the third analog-to-digital converter 373 may be input to the digital broadcast demodulator 382 for demodulating a digital TV broadcast signal, the YPbPr decoder 383 for decoding a YPbPb component video signal, and the SIF decoder 384 for decoding the analog broadcast audio signal SIF. One of the digital broadcast demodulator 382, the YPbPr decoder 383, and the analog broadcast audio signal SIF may be activated according to the content selection signal of the controller 160.

A digital PGA circuit 363 may be provided between the output of the third analog-to-digital converter 373 and the input of the SIF decoder 384. The digital PGA circuit 363 can amplify the analog broadcast audio signal SIF in digital form output from the third analog-to-digital converter 373, and the gain controller 362 may adjust the amplification factor of the digital PGA circuit 363.

As such, because the digital PGA circuit 363 is provided between the output of the third analog-to-digital converter 373 and the input of the SIF decoder 384, the analog PGA circuit 361 shown in FIG. 5 may be removed. As a result, the input circuit of the third analog-to-digital converter 373 can be simplified as shown in FIG. 6.

The method of removing the analog PGA circuit 361 shown in FIG. 5 is not limited to the circuit shown in FIG. 5.

Figure 7:
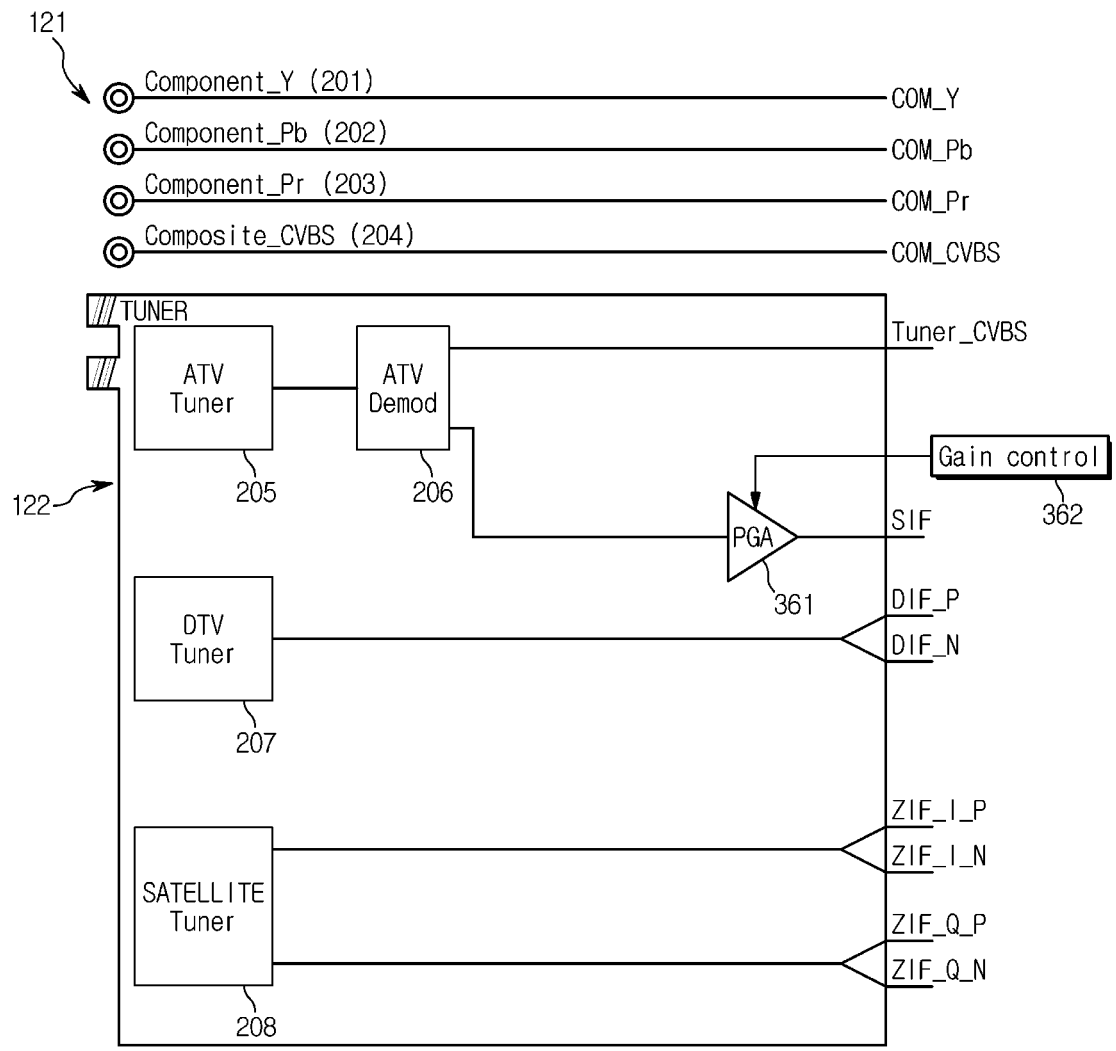
FIG. 7 shows another example of a content receiver included in a display apparatus according to an embodiment.
Figure 8:
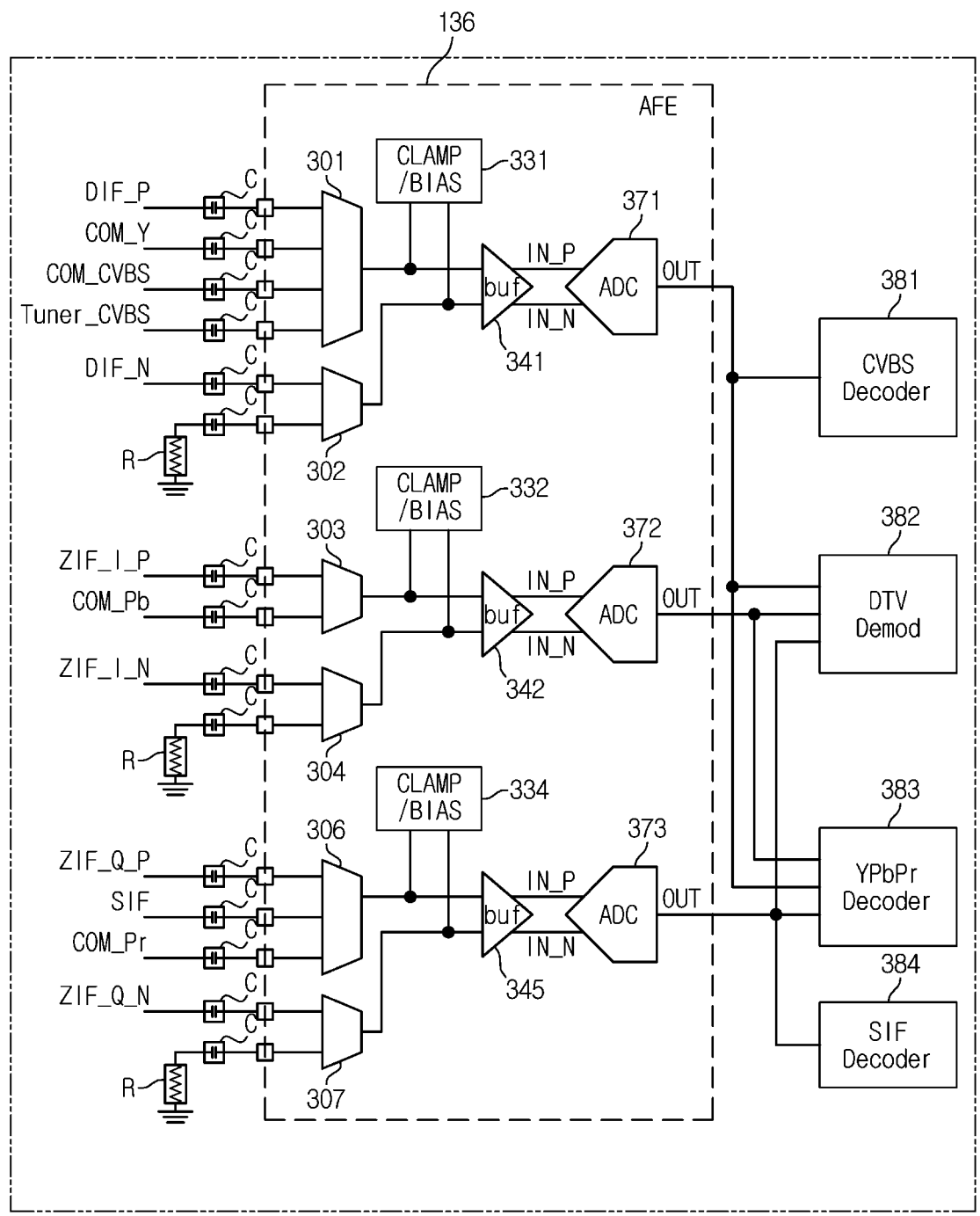
FIG. 8 shows an example of an image processer that receives a signal from the content receiver shown in FIG. 7.

FIG. 7 shows another example of a content receiver included in a display apparatus according to an embodiment. FIG. 8 shows an example of an image processer that receives a signal from the content receiver shown in FIG. 7.

As shown in FIG. 7, the content receiver 120 may include the analog PGA circuit 361.

The content receiver 120 includes the input terminals 121 and the tuner 122.

The input terminals 121 may include the first component terminal 201, the second component terminal 202, the third component terminal 203, and the composite terminal 204, and the tuner 122 may include the analog broadcast tuner 205, the analog broadcast demodulator 206, the digital broadcast tuner 207, and the satellite broadcast tuner 208.

The first component terminal 201, the second component terminal 202, the third component terminal 203, the composite terminal 204, the analog broadcast tuner 205, the analog broadcast demodulator 206, the digital broadcast tuner 207 and the satellite broadcast tuner 208 may be the same as those shown in FIG. 4.

Compared with the content receiver 120 shown in FIG. 4, the content receiver 120 shown in FIG. 7 may further include the analog PGA circuit 361 provided at the output of the analog broadcast demodulator 206.

The analog PGA circuit 361 may amplify the analog broadcast audio signal SIF output from the analog broadcast demodulator 206.

Also, the amplification factor of the analog PGA circuit 361 may be changed according to the gain control signal of the gain controller 362. In other words, the analog broadcast audio signal SIF of the content receiver 120 can be amplified by the analog PGA circuit 361, and the amplification factor of the analog PGA circuit 361 can be controlled by the gain controller 362 of the image processor 130.

Also, as shown in FIG. 8, the image processor 130 may include the analog front end 136, the CVBS decoder 381, the digital broadcast demodulator 382, the YPbPr decoder 383, and the SIF decoder 384. The analog front end 136, the CVBS decoder 381, the digital broadcast demodulator 382, the YPbPr decoder 383, and the SIF decoder 384 shown in FIG. 8 may be the same as those shown in FIG. 6.

Compared to the image processor 130 illustrated in FIG. 6, the image processor 130 illustrated in FIG. 8 may not include a digital PGA circuit. Since the content receiver 120 includes an analog PGA circuit that amplifies the analog broadcast audio signal SIF, the digital PGA circuit of the image processor 130 can be removed.

Figure 9:
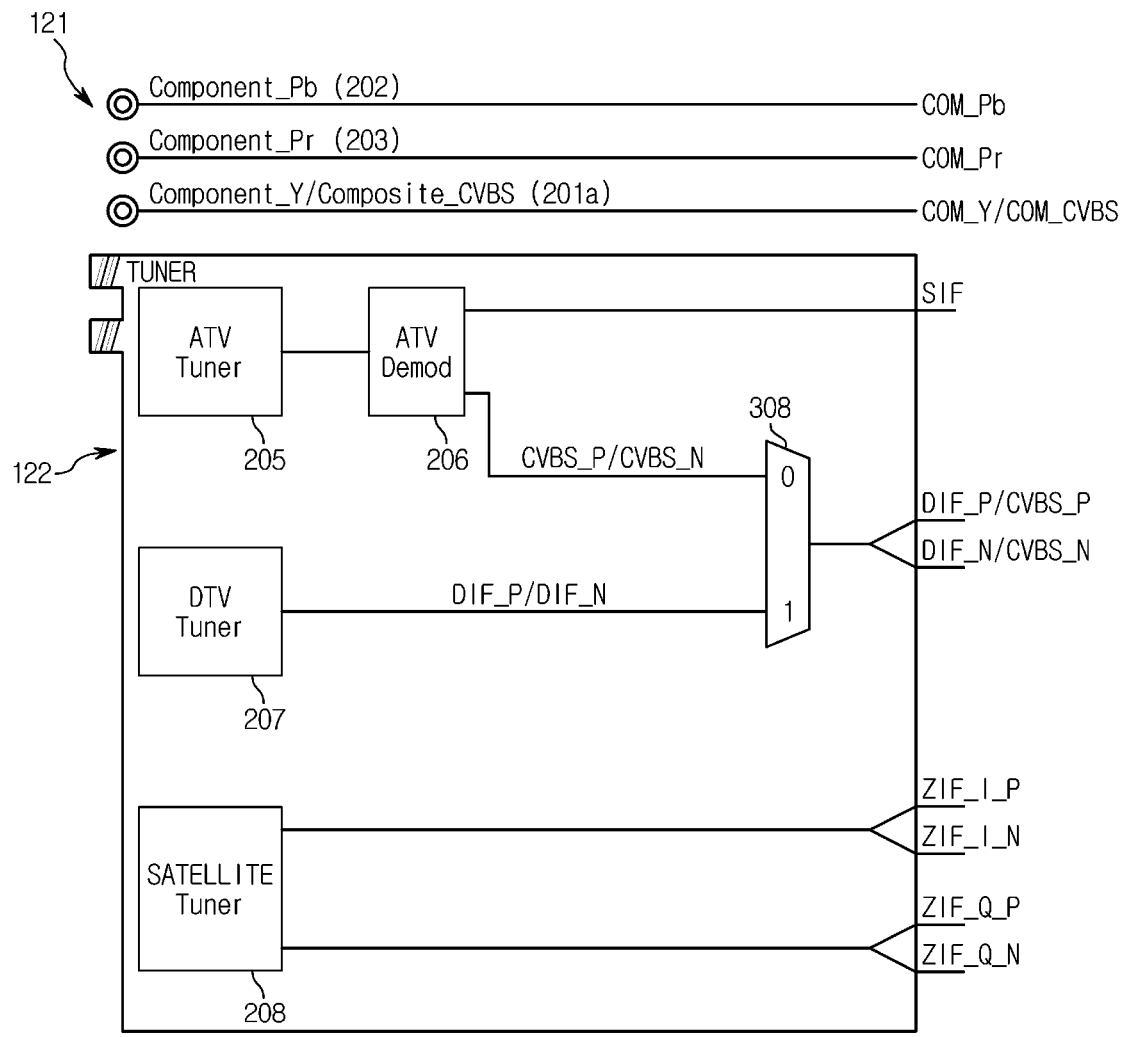
FIG. 9 shows another example of a content receiver included in a display apparatus according to an embodiment.
Figure 10:
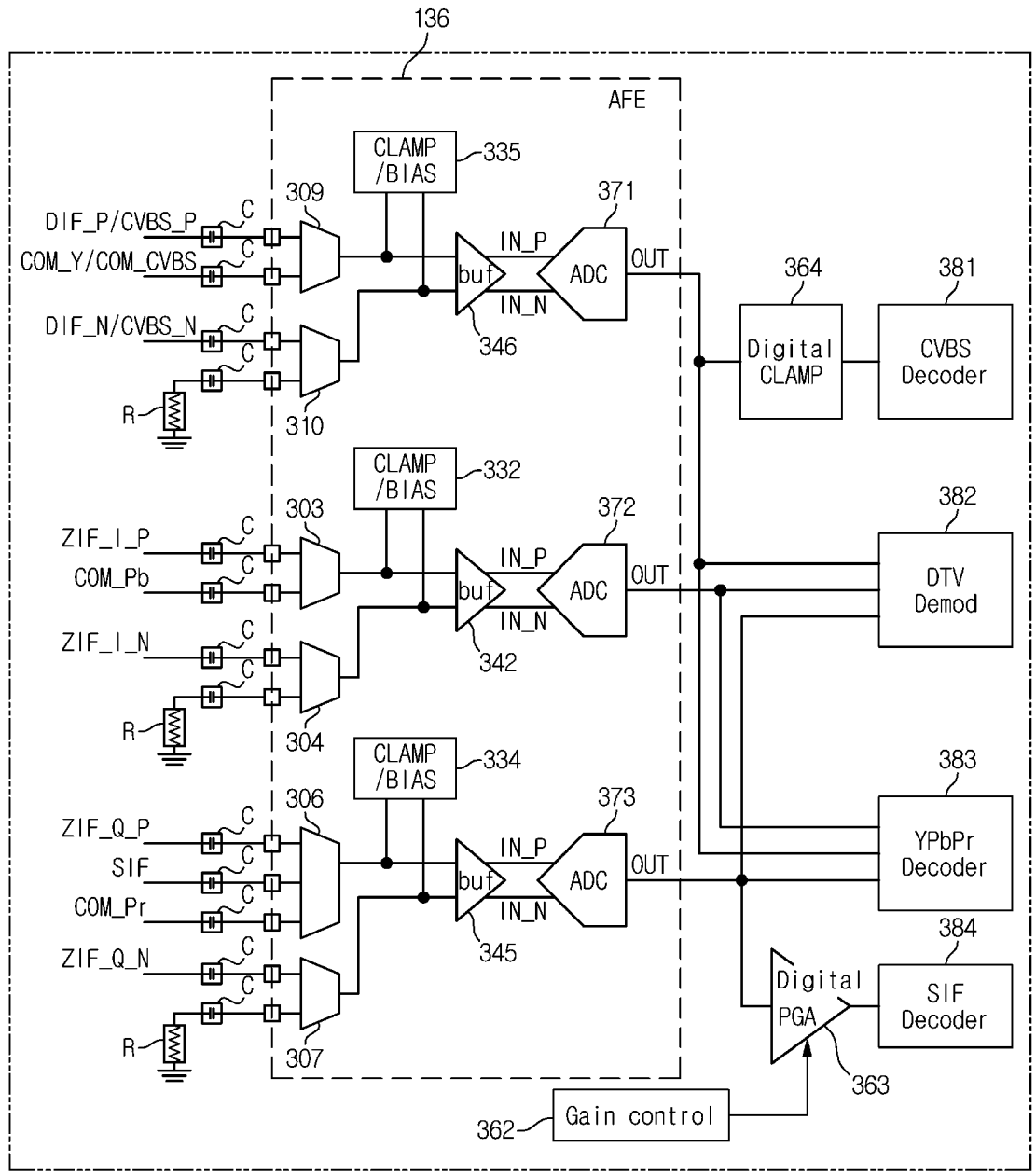
FIG. 10 shows an example of an image processer receiving a signal from the content receiver shown in FIG. 9.

FIG. 9 shows another example of a content receiver included in a display apparatus according to an embodiment. FIG. 10 shows an example of an image processer receiving a signal from the content receiver shown in FIG. 9.

Referring to FIG. 9, the content receiver 120 includes the input terminals 121 and the tuner 122.

The input terminals 121 may include a first component/composite terminal 201a, the second component terminal 202 and the third component terminal 203.

The first component/composite terminal 201a may receive the Y component video signal COM_Y or the composite video signal COM_CVBS. In other words, the Y component video signal COM_Y and the composite video signal COM_CVBS can both share the first component/composite terminal 201a, and the Y component output terminal or the composite output terminal of the content sources 1-5 may be connected to the first component/composite terminal 201a.

Further, the second component terminal 202 receives the Pb component video signal COM_Pb, and the third component terminal 203 may receive the Pr component video signal COM_Pr.

The YPbPr component video signals COM_Y, COM_Pb, and COM_Pr and the composite video signal COM_CVBS may include analog video information.

The tuner 122 may include the analog broadcast tuner 205, the analog broadcast demodulator 206, the digital broadcast tuner 207, the satellite broadcast tuner 208, and an eighth multiplexer 308.

The analog broadcast tuner 205 may receive an analog broadcast signal from the broadcast receiving antenna 1 or the wired cable 2, and extract a broadcast signal of a channel selected by the user from among the analog broadcast signals. In addition, the analog broadcast tuner 205 may convert a broadcast signal into an analog broadcast signal of an intermediate frequency.

The analog broadcast demodulator 206 demodulates an analog intermediate frequency broadcast signal, and analog broadcast video signals CVBS_P and CVBS_N and the analog broadcast audio signal SIF can be output.

The analog broadcast video signals CVBS_P and CVBS_N may be CVBS format signals or differential signals. For example, the analog broadcast video signals CVBS_P and CVBS_N may include the positive analog broadcast video signals CVBS_P and the negative analog broadcast video signals CVBS_N. The analog broadcast video signals CVBS_P and CVBS_N may include analog video information.

The analog broadcast audio signal SIF may be a voice intermediate frequency signal or a single-ended signal.

The digital broadcast tuner 207 may receive a digital broadcast signal from the broadcast receiving antenna 1 or the wired cable 2, and extract a broadcast signal of a channel selected by the user from among the digital broadcast signals. Also, the digital broadcast tuner 207 may convert a digital broadcast signal into a medium frequency broadcast signal.

The digital broadcast tuner 207 outputs the digital intermediate frequency signal DIF, and the digital intermediate frequency signal DIF may be a differential signal. The digital intermediate frequency signal DIF may include the positive digital intermediate frequency signal DIF_P and the negative digital intermediate frequency signal DIF_N.

The digital intermediate frequency signal DIF has the form of an analog signal, but may include digital image information.

The satellite broadcast tuner 208 may receive a satellite digital broadcast signal from the satellite reception antenna 3 and extract a broadcast signal of a channel selected by the user from the satellite digital broadcast signal. In addition, the satellite broadcast tuner 208 may convert the extracted broadcast signal into a baseband broadcast signal.

The satellite broadcast tuner 208 outputs the zero intermediate frequency I signal ZIF_I and the zero intermediate frequency Q signal ZIF_Q, and the zero intermediate frequency I signal ZIF_I and the zero intermediate frequency Q signal ZIF_Q may be differential signals, respectively. The zero intermediate frequency I signal ZIF_I may include the positive zero intermediate frequency I signal ZIF_I_P and the negative zero intermediate frequency I signal ZIF_I_N, and the zero intermediate frequency Q signal ZIF_Q may include the positive zero intermediate frequency Q signal ZIF_Q_P and the negative zero intermediate frequency Q signal ZIF_Q_N.

The eighth multiplexer 308 may be a 4×2 multiplexer that receives four signals and outputs two signals. The eighth multiplexer 308 may multiplex the positive and negative analog broadcast video signals CVBS_P and CVBS_N and the positive and negative digital intermediate frequency signals DIF_P and DIF_N according to the content selection signal of the controller 160.

The eighth multiplexer 308 receives the positive and negative analog broadcast video signals CVBS_P and CVBS_N and the positive and negative digital intermediate frequency signals DIF_P and DIF_N, and the eighth multiplexer 308 may output any one of the positive and negative analog broadcast video signals CVBS_P and CVBS_N and the positive and negative digital intermediate frequency signals DIF_P and DIF_N according to the content selection signal of the controller 160. For example, when analog TV broadcasting is selected, the eighth multiplexer 308 outputs the positive and negative analog broadcasting video signals CVBS_P and CVBS_N, and when digital TV broadcasting is selected, the eighth multiplexer 308 outputs the positive and negative digital intermediate frequency signals DIF_P and DIF_N.

As described above, the content receiver 120 outputs the Pb component video signal COM_Pb, the Pr component video signal COM_Pr, the analog broadcast audio signal SIF, the zero intermediate frequency I signal ZIF_I, and the zero intermediate frequency Q signal ZIF_Q. In addition, the content receiver 120 may further output one of the Y component video signal COM_Y and the composite video signal COM_CVBS (hereinafter referred to as 'Y component/composite video signal'), and one of the analog broadcast video signals CVBS_P and CVBS_N and the digital intermediate frequency signals DIF_P and DIF_N (hereinafter referred to as a "video/digital broadcast signal") may be further output.

In other words, the content receiver 120 can output a total of seven signals. The content receiver 120 illustrated in FIG. 9 may output two fewer signals as compared to the content receiver 120 illustrated in FIG. 4.

Referring to FIG. 10, the image processor 130 includes the analog front end 136 that converts signals output from the content receiver 120 into digital signals (or digital codes) and the CVBS decoder 381/the digital broadcast demodulator 382/the YPbPr decoder 383/the SIF decoder 384.

The analog front end 136 includes the first analog-to-digital converter 371, the second analog-to-digital converter 372, the third analog-to-digital converter 373, a ninth multiplexer 309, a tenth multiplexer 310, the third multiplexer 303, the fourth multiplexer 304, the sixth multiplexer 306 and the seventh multiplexer 307.

The first analog-to-digital converter 371, the second analog-to-digital converter 372, the third analog-to-digital converter 373, the third multiplexer 303, the fourth multiplexer 304, the sixth multiplexer 306 and the seventh multiplexer 307 may be the same as those shown in FIG. 6.

The ninth multiplexer 309 may be a 2×1 multiplexer that receives two signals and outputs one signal. The ninth multiplexer 309 may multiplex the Y component/composite video signal COM_Y/COM_CVBS and the positive video/digital broadcast signal DIF_P/CVBS_P according to the content selection signal of the controller 160.

The Y component/composite video signal COM_Y/COM_CVBS and the positive video/digital broadcast signal DIF_P/CVBS_P may be input to the ninth multiplexer 309 via the input capacitor C.

The ninth multiplexer 309 may output any one of the Y component/composite video signal COM_Y/COM_CVBS and the positive video/digital broadcast signal DIF_P/CVBS_P according to the content selection signal of the controller 160 into the positive input terminal IN_P of the first analog-to-digital converter 371. For example, when a component terminal or a composite terminal is selected, the ninth multiplexer 309 outputs the Y component/composite video signal COM_Y/COM_CVBS, and when analog TV broadcasting or digital TV broadcasting is selected, the ninth multiplexer 309 may output the positive video/digital broadcasting signal DIF_P/CVBS_P.

The tenth multiplexer 310 may be a 2×1 multiplexer that receives two signals and outputs one signal. The tenth multiplexer 310 may multiplex the negative video/digital broadcast signal DIF_N/CVBS_N and the 'ground signal' according to the content selection signal of the controller 160.

Any one of the two inputs of the tenth multiplexer 310 may be connected to the 'ground signal' through the resistor R. The negative video/digital broadcast signal DIF_N/CVBS_N may be input to the other of the two inputs of the tenth multiplexer 310 through the input capacitor C.

The tenth multiplexer 310 may output any one of the negative video/digital broadcast signal DIF_N/CVBS_N and the 'ground signal' according to the content selection signal of the controller 160 to the negative input terminal IN_N of the first analog-to-digital converter 371. Since the Y component/composite video signal COM_Y/COM_CVBS is a single-ended signal, when the component terminal or the composite terminal is selected, the tenth multiplexer 310 may output the 'ground signal.' Also, when analog TV broadcasting or digital TV broadcasting is selected, the tenth multiplexer 310 may output the negative video/digital broadcasting signal DIF_N/CVBS_N.

The output of the ninth multiplexer 309 and the output of the tenth multiplexer 310 may be respectively connected to the output of a fifth clamping/biasing circuit 335. The fifth clamping/biasing circuit 335 may clamp or bias the output of the ninth multiplexer 309 and the output of the tenth multiplexer 310.

When the Y component/composite video signal COM_Y/COM_CVBS is output from the ninth multiplexer 309, to restore the DC component of the Y component/composite video signal COM_Y/COM_CVBS, the fifth clamping/biasing circuit 335 may clamp the output of the ninth multiplexer 309 according to the Y component/composite video signal COM_Y/COM_CVBS output from the content receiver 120.

When the video/digital broadcast signals DIF_P/CVBS_P and DIF_N/CVBS_N are output from the ninth and tenth multiplexers 309 and 310, the fifth clamping/biasing circuit 335 may bias the output of the ninth and tenth multiplexers 309 and 310. For example, the fifth clamping/biasing circuit 335 may output a biasing voltage having a predetermined size.

As such, the fifth clamping/biasing circuit 335 clamps the output of the ninth multiplexer 309 according to the Y component/composite video signal COM_Y/COM_CVBS, or biases the outputs of the ninth and tenth multiplexers 309 and 310.

The output of the ninth multiplexer 309 and the output of the tenth multiplexer 310 may be input to a sixth buffer 346. The output currents of the ninth multiplexer 309 and the tenth multiplexer 310 may be amplified by the sixth buffer 346.

The first analog-to-digital converter 371 receives the output of the ninth multiplexer 309 and the output of the tenth multiplexer 310 passing through the sixth buffer 346, and the difference (analog signal) between the output of the ninth multiplexer 309 and the output of the tenth multiplexer 310 may be converted into a digital signal (digital code).

The output of the first analog-to-digital converter 371 may be input to the CVBS decoder 381 for decoding a CVBS type signal, the digital broadcast demodulator 382 that demodulates a digital TV broadcast signal, and the YPbPr decoder 383 for decoding the YPbPb component video signal. One of the CVBS decoder 381, the digital broadcast demodulator 382, and the YPbPr decoder 383 may be activated according to the content selection signal of the controller 160.

A digital clamping circuit 364 may be provided between the output of the first analog-to-digital converter 371 and the input of the CVBS decoder 381. The digital clamping circuit 364 may restore the DC component of the digitized analog broadcast video signals CVBS_P and CVBS_N. As described above, the analog broadcast video signal includes analog video information, and includes video information in both the AC component and the DC component. In the process of converting an analog broadcast video signal to a differential signal, the DC components may be lost. The digital clamping circuit 364 may restore the DC component of the analog broadcast video signals CVBS_P and CVBS_N lost in the process of converting them into differential signals.

The content receiver 120 includes a multiplexer for multiplexing the analog broadcast video signals CVBS_P and CVBS_N and the digital intermediate frequency signals DIF_P and DIF_N, and therefore the number of input signals to the analog front end 136 is reduced, and the number of inputs of the multiplexer connected to the first analog-to-digital converter 371 is reduced.

In the content receiver 120, the analog broadcast video signals CVBS_P and CVBS_N and the digital intermediate frequency signals DIF_P and DIF_N are not limited to multiplexing. For example, the analog broadcast video signals CVBS_P and CVBS_N and the zero intermediate frequency I signals ZIF_I_P and ZIF_I_N are multiplexed, or the analog broadcast video signals CVBS_P and CVBS_N and the zero intermediate frequency Q signals ZIF_Q_P and ZIF_Q_N can be multiplexed In addition, the method of reducing the number of inputs of the multiplexer is not limited to the circuits shown in FIGS. 9 and 10.

Figure 11:
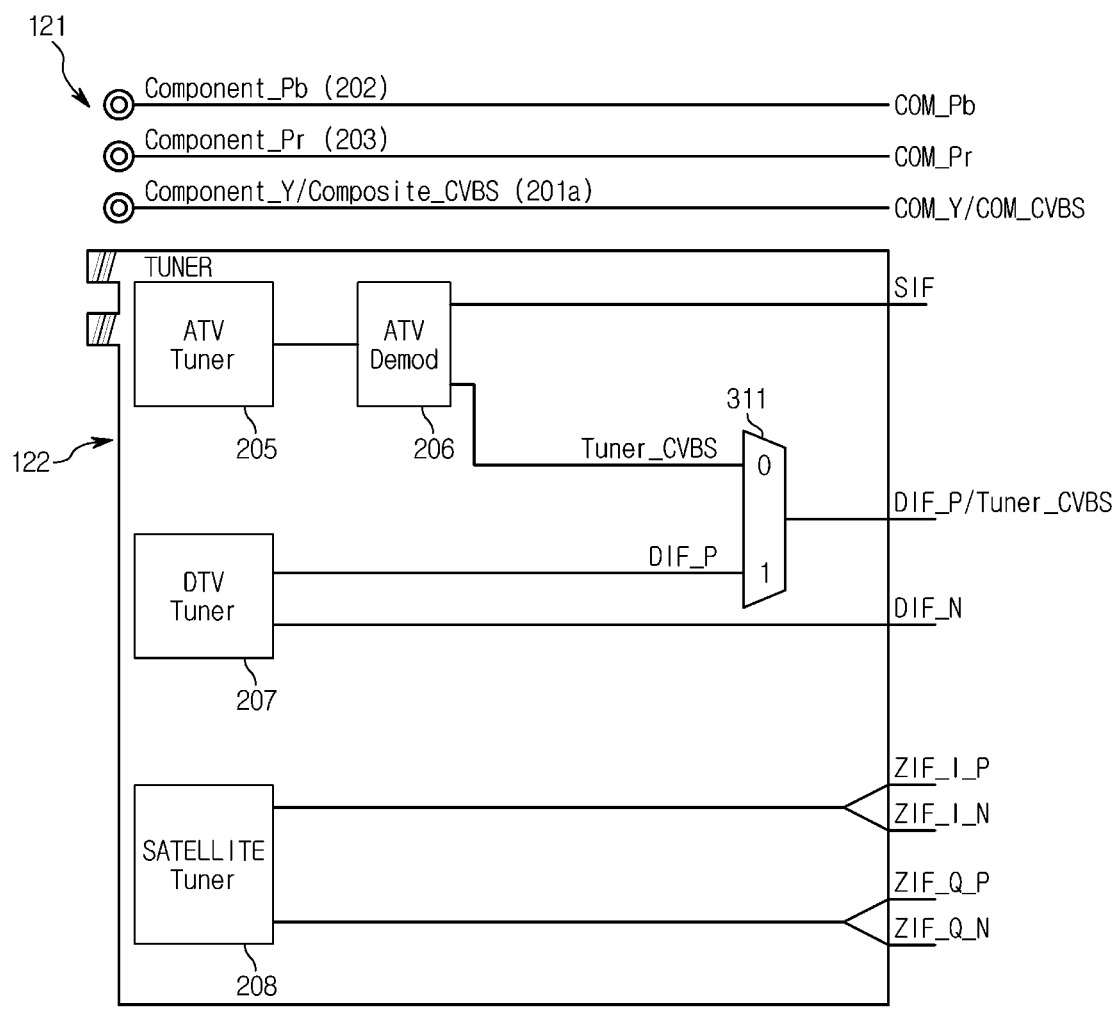
FIG. 11 shows another example of a content receiver included in a display apparatus according to an embodiment.
Figure 12:
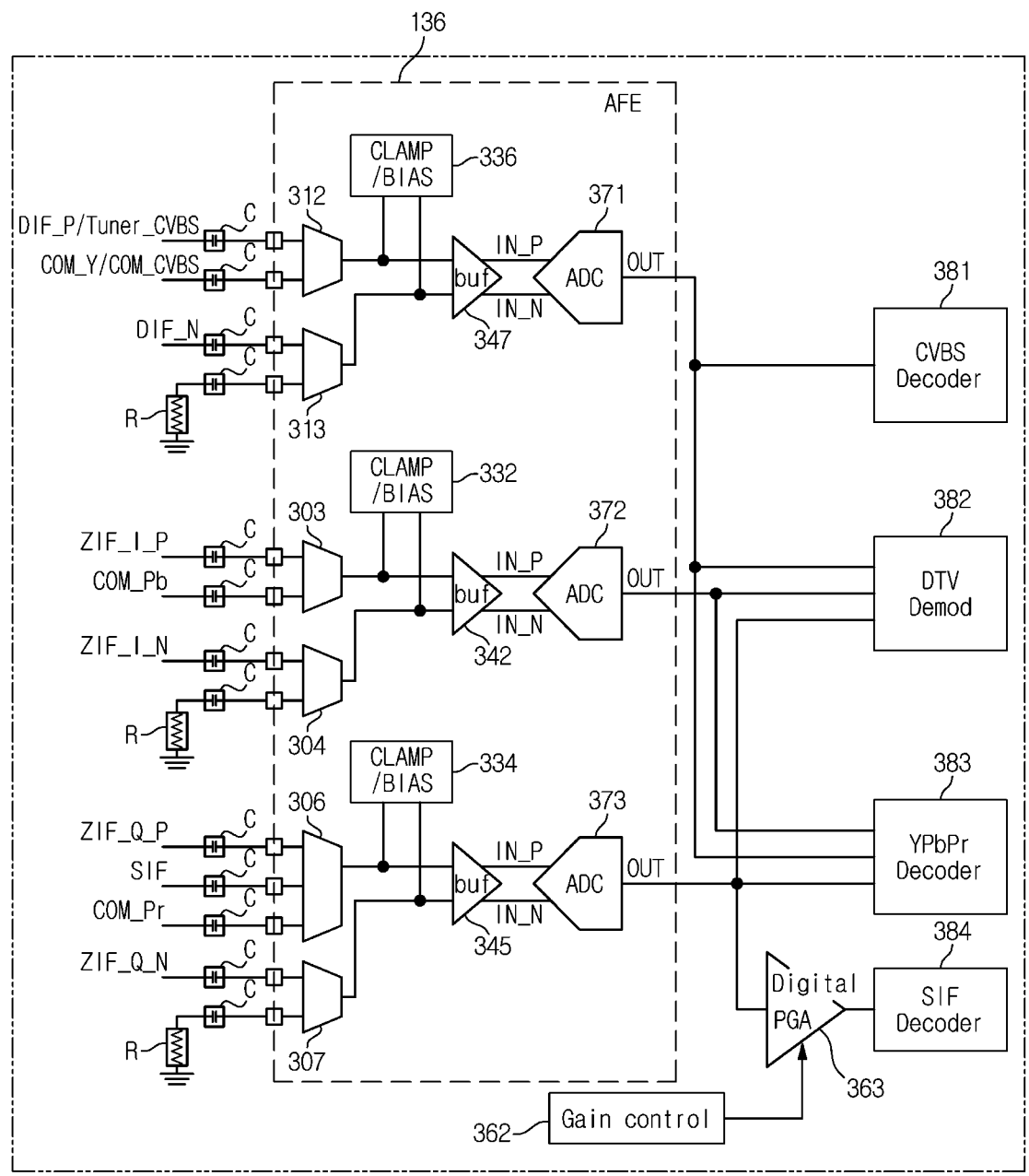
FIG. 12 shows an example of an image processor receiving a signal from the content receiver shown in FIG. 11.

FIG. 11 shows another example of a content receiver included in a display apparatus according to an embodiment. FIG. 12 shows an example of an image processor receiving a signal from the content receiver shown in FIG. 11.

As shown in FIG. 11, the content receiver 120 includes the input terminals 121 and the tuner 122.

The input terminals 121 include the first component/composite terminal 201a, the second component terminal 202, and the third component terminal 203, and the tuner 122 includes the analog broadcast tuner 205, the analog broadcast demodulator 206, the digital broadcast tuner 207, the satellite broadcast tuner 208 and an eleventh multiplexer 311.

The first component/composite terminal 201a, the second component terminal 202, the third component terminal 203, the analog broadcast tuner 205, the analog broadcast demodulator 206, the digital broadcast tuner 207, and the satellite broadcast tuner 208 shown in FIG. 11 may be the same as those shown in FIG. 9. Compared with the content receiver 120 shown in FIG. 9, the tuner 122 shown in FIG. 11 may include the eleventh multiplexer 311 multiplexing the analog broadcast video signal Tuner_CVBS and the positive digital intermediate frequency signal DIF_P.

The eleventh multiplexer 311 may be a 2×1 multiplexer that receives two signals and outputs one signal. The eleventh multiplexer 311 may receive the analog broadcast video signal Tuner_CVBS and the positive digital intermediate frequency signal DIF_P, and outputs any one of the analog broadcast video signal Tuner_CVBS and the positive digital intermediate frequency signal DIF_P (hereinafter referred to as 'video/digital broadcast signal DIF P/Tuner CVBS') according to the content selection signal of the controller 160. For example, when analog TV broadcasting is selected, the eleventh multiplexer 311 may output the analog broadcasting video signal Tuner_CVBS, and when digital TV broadcasting is selected, the eleventh multiplexer 311 may output the positive digital intermediate frequency signal DIF_P.

In addition, as shown in FIG. 12, the image processor 130 includes the analog front end 136, and the analog front end 136 includes the first analog-digital converter 371 and the second analog-digital converter 372, the third analog-to-digital converter 373, a twelfth multiplexer 312, a thirteenth multiplexer 313, the third multiplexer 303, the fourth multiplexer 304, the sixth multiplexer 306, and the seventh multiplexer 307.

The first analog-to-digital converter 371, the second analog-to-digital converter 372, the third analog-to-digital converter 373, the third multiplexer 303, the fourth multiplexer 304, the sixth multiplexer 306 and the seventh multiplexer 307 may be the same as that shown in FIG. 10.

The twelfth multiplexer 312 may be a 2×1 multiplexer that receives two signals and outputs one signal. The twelfth multiplexer 312 may multiplex the Y component/composite video signal COM_Y/COM_CVBS and the video/digital broadcast signal DIF_P/Tuner_CVBS according to the content selection signal of the controller 160.

The Y component/composite video signal COM_Y/COM_CVBS and the video/digital broadcast signal DIF_P/Tuner_CVBS may be input to the twelfth multiplexer 312 through the input capacitor C.

The twelfth multiplexer 312 may output any one of the Y component/composite video signal COM_Y/COM_CVBS and the video/digital broadcast signal DIF_P/Tuner_CVBS according to the content selection signal of the controller 160 into the positive input terminal IN_P of the first analog-to-digital converter 371. For example, when a component terminal or a composite terminal is selected, the twelfth multiplexer 312 outputs the Y component/composite video signal COM_Y/COM_CVBS, and when analog TV broadcasting or digital TV broadcasting is selected, the twelfth multiplexer 312 may output the positive video/digital broadcasting signal DIF_P/Tuner_CVBS.

The thirteenth multiplexer 313 may be a 2×1 multiplexer that receives two signals and outputs one signal. The thirteenth multiplexer 313 may multiplex the negative digital intermediate frequency signal DIF_N and the 'ground signal' according to the content selection signal of the controller 160.

The thirteenth multiplexer 313 may output any one of the negative digital intermediate frequency signal DIF_N and the 'ground signal' according to the content selection signal of the controller 160 to the negative input terminal IN_N of the first analog-to-digital converter 371. Since the Y component/composite video signal COM_Y/COM_CVBS is a single-ended signal, when the component terminal or composite terminal is selected, the thirteenth multiplexer 313 may output the 'ground signal.' Since the analog broadcast video signal Tuner_CVBS is also a single-ended signal, when the analog TV broadcast is selected, the thirteenth multiplexer 313 may output the 'ground signal.' Also, when digital TV broadcasting is selected, the thirteenth multiplexer 313 may output the negative digital intermediate frequency signal DIF_N.

The output of the twelfth multiplexer 312 and the output of the thirteenth multiplexer 313 may be connected to the output of a sixth clamping/biasing circuit 336, respectively. The sixth clamping/biasing circuit 336 may clamp or bias the output of the twelfth multiplexer 312 and the output of the thirteenth multiplexer 313.

When the Y component/composite video signal COM_Y/COM_CVBS is output from the twelfth multiplexer 312, to restore the DC component of the Y component/composite video signal COM_Y/COM_CVBS, the sixth clamping/biasing circuit 336 may clamp the output of the twelfth multiplexer 312 according to the Y component/composite video signal COM_Y/COM_CVBS output from the content receiver 120.

When the analog broadcast video signal Tuner_CVBS is output from the twelfth multiplexer 312, to restore the DC component of the analog broadcast video signal Tuner_CVBS, the sixth clamping/biasing circuit 336 may clamp the output of the twelfth multiplexer 312 according to the analog broadcast video signal Tuner_CVBS output from the content receiver 120.

Also, when the digital intermediate frequency signals DIF_P and DIF_N are output from the twelfth and thirteenth multiplexers 312 and 313, the sixth clamping/biasing circuit 336 may bias the output of the twelfth multiplexer 312.

As such, the sixth clamping/biasing circuit 336 clamps the Y component/composite video signal COM_Y/COM_CVBS and the analog broadcast video signal Tuner_CVBS, or biases the positive and negative digital intermediate frequency signals DIF_P and DIF_N.

The output of the twelfth multiplexer 312 and the output of the thirteenth multiplexer 313 may be input to a seventh buffer 347. The output currents of the twelfth multiplexer 312 and the thirteenth multiplexer 313 may be amplified by the seventh buffer 347.

The first analog-to-digital converter 371 receives the output of the twelfth multiplexer 312 and the thirteenth multiplexer 313 passing through the seventh buffer 347, and converts the difference between the output of the twelfth multiplexer 312 and the outputs of the thirteenth multiplexer 313 (analog signal) can be converted into a digital signal (digital code).

The digital clamping circuit may be removed between the output of the first analog-to-digital converter 371 and the input of the CVBS decoder 381. Since the analog broadcast video signal Tuner_CVBS is clamped by the sixth clamping/biasing circuit 336, a separate digital clamping circuit is not required.

As such, the content receiver 120 includes a multiplexer that multiplexes the analog broadcast video signal Tuner_CVBS and the digital intermediate frequency signal DIF. Therefore, the number of input signals to the analog front end 136 is reduced, and the number of inputs of the multiplexer connected to the first analog-to-digital converter 371 may be reduced.

The composite video signal COM_CVBS and the Y component video signal COM_Y are not limited to sharing one input terminal. For example, the composite video signal COM_CVBS and the Pb component video signal COM_Pb can share one input terminal, or the composite video signal COM_CVBS and the Pr component video signal COM_Pr can share one input terminal.

In addition, the analog broadcast video signal Tuner_CVBS and the positive digital intermediate frequency signal DIF_P are not limited to being multiplexed in the content receiver 120. The analog broadcast video signal Tuner_CVBS and the negative digital intermediate frequency signal DIF_N may be multiplexed. In addition, the analog broadcast video signal Tuner_CVBS and any one of the zero intermediate frequency signals ZIF_I_P, ZIF_I_N, ZIF_Q_P, and ZIF_Q_N may be multiplexed.

Figure 13:
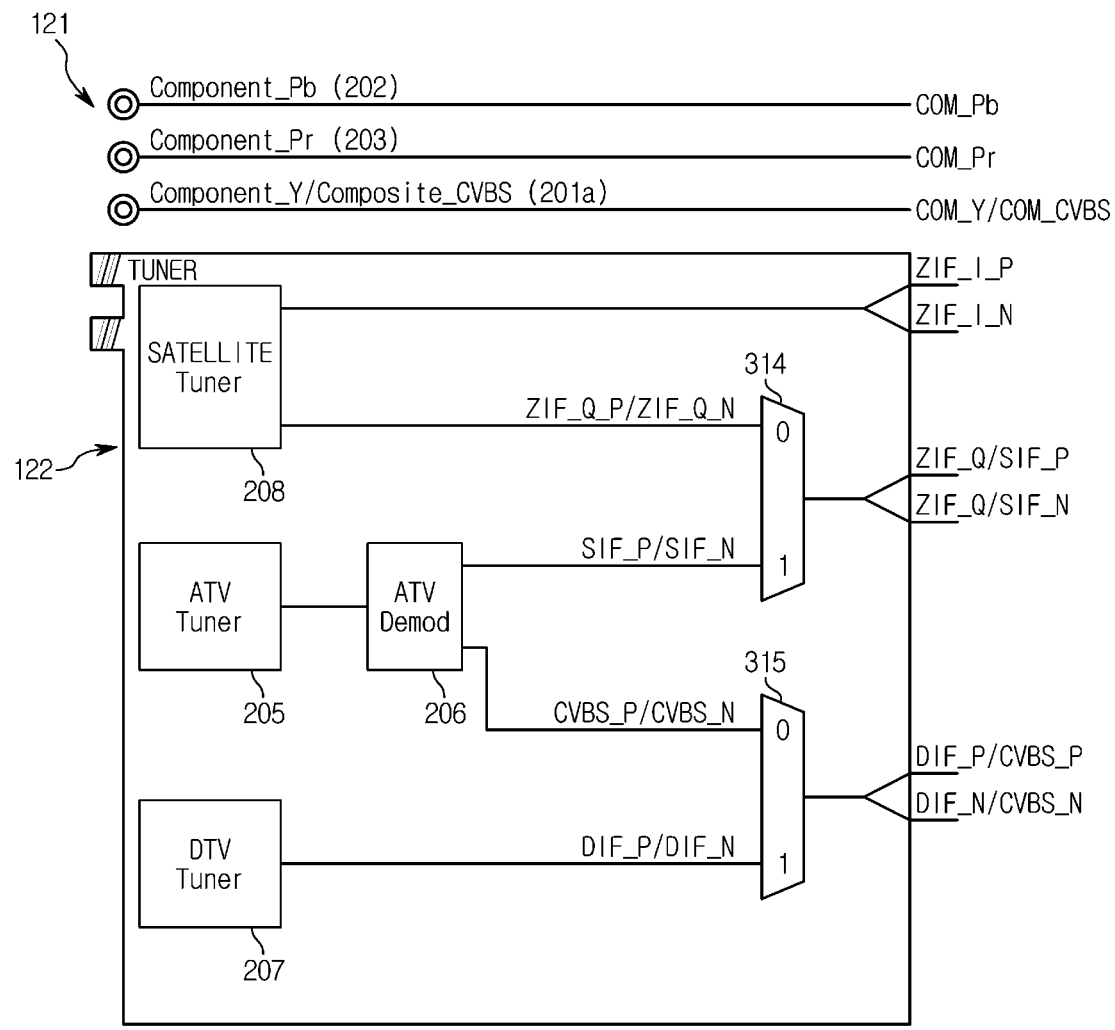
FIG. 13 shows another example of a content receiver included in a display apparatus according to an embodiment.

FIG. 13 shows another example of a content receiver included in a display apparatus according to an embodiment.

Figure 14:
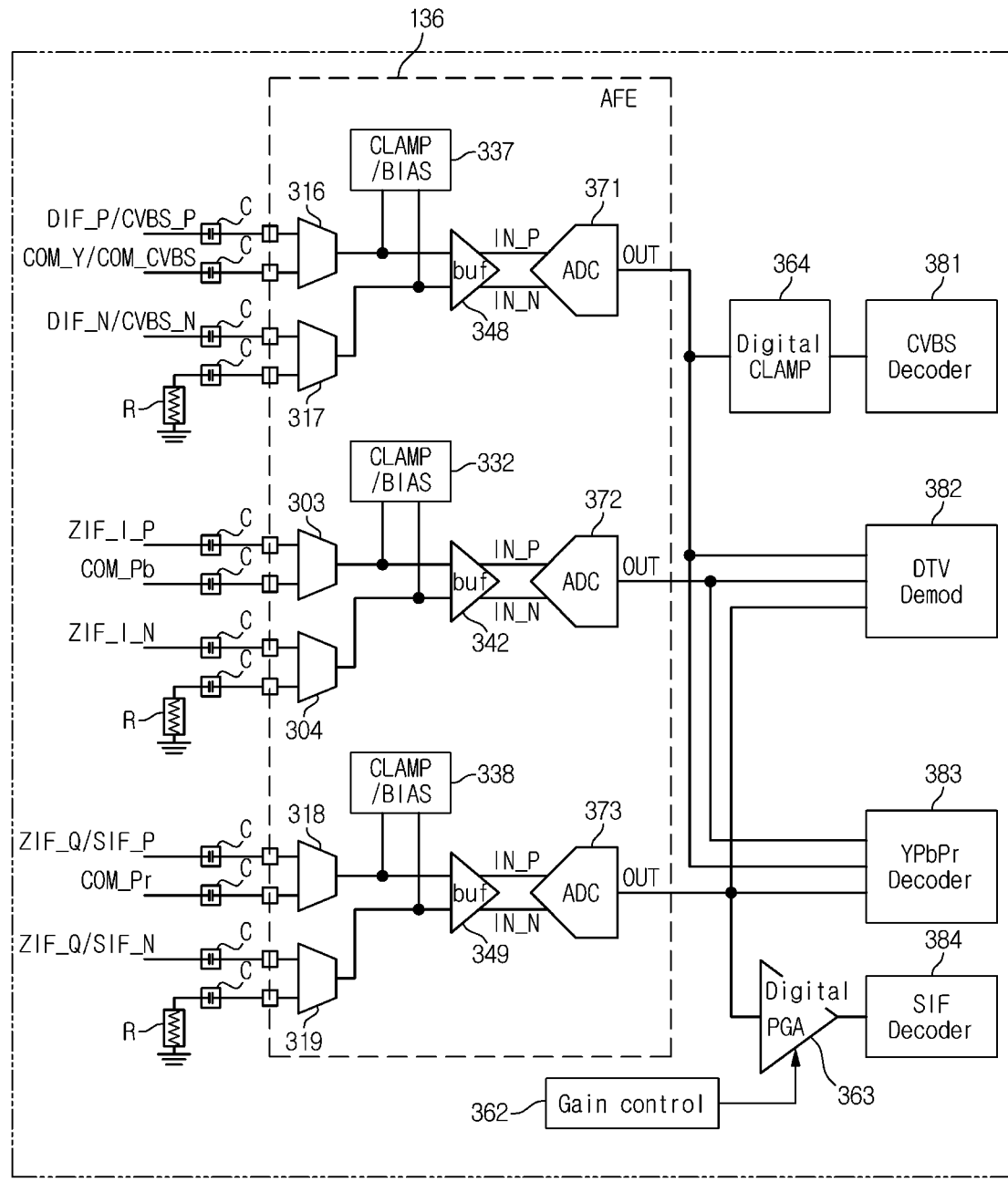
FIG. 14 shows an example of an image processor that receives a signal from the content receiver shown in FIG. 13.

FIG. 14 shows an example of an image processor that receives a signal from the content receiver shown in FIG. 13.

Referring to FIG. 13, the content receiver 120 includes the input terminals 121 and the tuner 122.

The input terminals 121 may include the first component/composite terminal 201a, the second component terminal 202 and the third component terminal 203, and the tuner 122 may include the analog broadcast tuner 205, the analog broadcast demodulator 206, the digital broadcast tuner 207, the satellite broadcast tuner 208, a fourteenth multiplexer 314 and a fifteenth multiplexer 315.

The first component/composite terminal 201a, the second component terminal 202, the third component terminal 203, the analog broadcast tuner 205, the digital broadcast tuner 207, and the satellite broadcast tuner 208 shown in FIG. 13 may be the same as those shown in FIG. 9.

The analog broadcast demodulator 206 may demodulate the analog intermediate frequency broadcast signal and output video signals CVBS_P and CVBS_N and audio signals SIF_P and SIF_N. The analog broadcast video signals CVBS_P and CVB_N and the analog broadcast audio signals SIF_P and SIF_N may be differential signals. For example, the analog broadcast video signals CVBS_P and CVBS_N include the positive analog broadcast video signal CVBS_P and the negative analog broadcast video signal CVBS_N, and the analog broadcast audio signals SIF_P and SIF_N may include the positive analog broadcast audio signal SIF_P and the negative analog broadcast audio signal SIF_N.

The fourteenth multiplexer 314 may be a 4×2 multiplexer that receives four signals and outputs two signals. The fourteenth multiplexer 314 may multiplex the positive and negative zero intermediate frequency Q signals ZIF_Q_P and ZIF_Q_N and the positive and negative analog broadcast audio signals SIF_P and SIF_N according to the content selection signal of the controller 160.

The fourteenth multiplexer 314 receives the positive and negative zero intermediate frequency Q signals ZIF_Q_P and ZIF_Q_N and the positive and negative analog broadcast audio signals SIF_P and SIF_N, and outputs any one of the positive and negative zero intermediate frequency Q signals ZIF_Q_P and ZIF_Q_N and the positive and negative analog broadcast audio signals SIF_P and SIF_N depending on the content selection signal of the controller 160. For example, when satellite digital TV broadcasting is selected, the fourteenth multiplexer 314 outputs the positive and negative zero intermediate frequency Q signals ZIF_Q_P and ZIF_Q_N, and when analog broadcast is selected, the fourteenth multiplexer 314 may output the positive and negative analog broadcast audio signals SIF_P and SIF_N.

The fifteenth multiplexer 315 may be a 4×2 multiplexer that receives four signals and outputs two signals. The fifteenth multiplexer 315 may multiplex the positive and negative analog broadcast video signals CVBS_P and CVBS_N and the positive and negative digital intermediate frequency signals DIF_P and DIF_N according to the content selection signal of the controller 160.

The fifteenth multiplexer 315 receives the positive and negative analog broadcast video signals CVBS_P and CVBS_N and the positive and negative digital intermediate frequency signals DIF_P and DIF_N, and outputs one of the positive and negative analog broadcast video signals CVBS_P and CVBS_N and the positive and negative digital intermediate frequency signals DIF_P and DIF_N according to the content selection signal of the controller 160. For example, when analog TV broadcasting is selected, the fifteenth multiplexer 315 outputs the positive and negative analog broadcasting video signals CVBS_P and CVBS_N, and when digital TV broadcasting is selected, the fifteenth multiplexer 315 may output the positive and negative digital intermediate frequency signals DIF_P and DIF_N.

As described above, the content receiver 120 may output any one of the Y component video signal COM_Y and the composite video signal COM_CVBS (hereinafter referred to as 'Y component/composite video signal'), and the Pb component video signal COM_Pb, the Pr component video signal COM_Pr and the zero intermediate frequency I signal ZIF_I. In addition, the content receiver 120 may further output any one of the zero intermediate frequency Q signals ZIF_Q_P and ZIF_Q_N and the analog broadcast audio signals SIF_P and SIF_N (hereinafter referred to as 'satellite/audio broadcast signal'), and the analog broadcast video signals CVBS_P and CVBS_N, and the digital intermediate frequency signals DIF_P and DIF_N (hereinafter referred to as 'video/digital broadcast signals').

In other words, the content receiver 120 can output a total of six signals. The content receiver 120 illustrated in FIG. 13 may output three fewer signals than the content receiver 120 illustrated in FIG. 4.

Referring to FIG. 14, the image processor 130 includes the analog front end 136 and the CVBS decoder 381/the digital broadcast demodulator 382/the YPbPr decoder 383/the SIF decoder 384 that processes digital signals.

The first analog-to-digital converter 371, the second analog-to-digital converter 372, the third analog-to-digital converter 373, the third multiplexer 303 and the fourth multiplexer 304 may be the same as those shown in FIG. 6. In addition, a sixteenth multiplexer 316, a seventeenth multiplexer 317, a seventh clamping/biasing circuit 337 and an eighth buffer 348 are respectively the ninth multiplexer 309 and the tenth multiplexer may be the same with the ninth multiplexer 309, the tenth multiplexer 310, the sixth clamping/biasing circuit 336 and the seventh buffer 347 shown in FIG. 10 respectively.

An eighteenth multiplexer 318 may be a 2×1 multiplexer that receives two signals and outputs one signal. The eighteenth multiplexer 318 may multiplex the positive satellite/audio broadcast signal ZIF_Q_P/SIF_P and the Pr component video signal COM_Pr according to the content selection signal of the controller 160.

The positive satellite/audio broadcast signal ZIF_Q_P/SIF_P and the Pr component video signal COM_Pr may be input to the eighteenth multiplexer 318 via the input capacitor C.

The eighteenth multiplexer 318 outputs any one of the positive satellite/audio broadcast signal ZIF_Q_P/SIF_P and the Pr component video signal COM_Pr according to the content selection signal of the controller 160 to the positive input terminal IN_P of the third analog-to-digital converter 373. For example, when the satellite digital broadcasting and/or analog broadcasting is selected, the eighteenth multiplexer 318 outputs the positive satellite/audio broadcasting signal ZIF_Q_P/SIF_P, and when the component terminal is selected, the eighteenth multiplexer 318 may multiplex Pr The component video signal COM_Pr.

A nineteenth multiplexer 319 may be a 2×1 multiplexer that receives two signals and outputs one signal. The eighteenth multiplexer 318 may multiplex the negative satellite/audio broadcast signal ZIF_Q_N/SIF_N and the 'ground signal' according to the content selection signal of the controller 160.

Any one of the two inputs of the nineteenth multiplexer 319 may be connected to the 'ground signal' through the resistor R, and the other of the two inputs of the nineteenth multiplexer 319 may be connected to the negative satellite/audio broadcast signal ZIF_Q_N/SIF_N through the input capacitor C.

The nineteenth multiplexer 319 may output any one of the negative satellite/audio broadcast signal ZIF_Q_N/SIF_N and the 'ground signal' according to the content selection signal of the controller 160 to the negative input terminal IN_N of the third analog-to-digital converter 373. For example, when satellite digital broadcasting and/or analog broadcasting is selected, the nineteenth multiplexer 319 outputs the negative satellite/audio broadcasting signal ZIF_Q_N/SIF_N, and when the component terminal is selected, the nineteenth multiplexer 319 may output the 'ground signal.'

The output of the eighteenth multiplexer 318 and the output of the nineteenth multiplexer 319 are clamped by an eighth clamping/biasing circuit 338, and the output currents of the eighteenth multiplexer 318 and the nineteenth multiplexer 319 may be amplified by a ninth buffer 349.

The output of the eighteenth multiplexer 318 and the output of the nineteenth multiplexer 319 may be connected to the output of the eighth clamping/biasing circuit 338, respectively. The eighth clamping/biasing circuit 338 may clamp or bias the output of the eighteenth multiplexer 318 and the output of the nineteenth multiplexer 319.

The output of the eighteenth multiplexer 318 and the output of the nineteenth multiplexer 319 may be connected to the output of the eighth clamping/biasing circuit 338, respectively. The eighth clamping/biasing circuit 338 may clamp or bias the output of the eighteenth multiplexer 318 and the output of the nineteenth multiplexer 319.

When the positive satellite/audio broadcast signal ZIF_Q_P/SIF_P is output from the eighteenth multiplexer 318, the eighth clamping/biasing circuit 338 may bias the output of the eighteenth multiplexer 318.

When the Pr component video signal COM Pr is output from the eighteenth multiplexer 318, to restore the DC component of the Pr component video signal COM_Pr, the eighth clamping/biasing circuit 338 may clamp the output of the eighteenth multiplexer 318 according to the Pr component video signal COM Pr output from the content receiver 120.

In addition, when the negative satellite/audio broadcast signal ZIF_Q N/SIF_N is output from the nineteenth multiplexer 319, the eighth clamping/biasing circuit 338 may bias the output of the nineteenth multiplexer 319.

As such, the eighth clamping/biasing circuit 338 may clamp the Pr component video signal COM_Pr or bias the positive and negative satellite/audio broadcasting signals ZIF_Q_P/SIF_P and ZIF_Q_N/SIF_N.

The output of the eighteenth multiplexer 318 and the output of the nineteenth multiplexer 319 may be input to the ninth buffer 349. The output currents of the eighteenth multiplexer 318 and the nineteenth multiplexer 319 may be amplified by the ninth buffer 349.

The third analog-to-digital converter 373 receives the output of the eighteenth multiplexer 318 and the output of the nineteenth multiplexer 319 passing through the ninth buffer 349, and converts the difference (analog signal) between the output of the eighteenth multiplexer 318 and the output of the nineteenth multiplexer 319 into a digital signal (digital code).

As described above, the content receiver 120 includes a multiplexer for multiplexing the analog broadcast video signal Tuner_CVBS and the digital intermediate frequency signal DIF and a multiplexer for multiplexing the zero intermediate frequency Q signal ZIF_Q, so that the number of signals that are input to the analog front end 136 can be reduced.

In the content receiver 120, the analog broadcast video signals CVBS_P and CVBS_N and the digital intermediate frequency signals DIF_P and DIF_N are not limited to multiplexing. For example, the analog broadcast video signals CVBS_P and CVBS_N and the zero intermediate frequency I signals ZIF_I_P and ZIF_I_N are multiplexed, or the analog broadcast video signals CVBS_P and CVBS_N and the zero intermediate frequency Q signals ZIF_Q_P and ZIF_Q_N are multiplexed.

In addition, the analog broadcast audio signals SIF_P and SIF_N and the zero intermediate frequency Q signals ZIF_Q_P and ZIF_Q_N are not limited to being multiplexed in the content receiver 120. For example, the analog broadcast audio signals SIF_P and SIF_N and the zero intermediate frequency I signals ZIF_I_P and ZIF_I_N are multiplexed, or the analog broadcast audio signals SIF_P and SIF_N and the digital intermediate frequency signals DIF_P and DIF_N are multiplexed.

Figure 15:
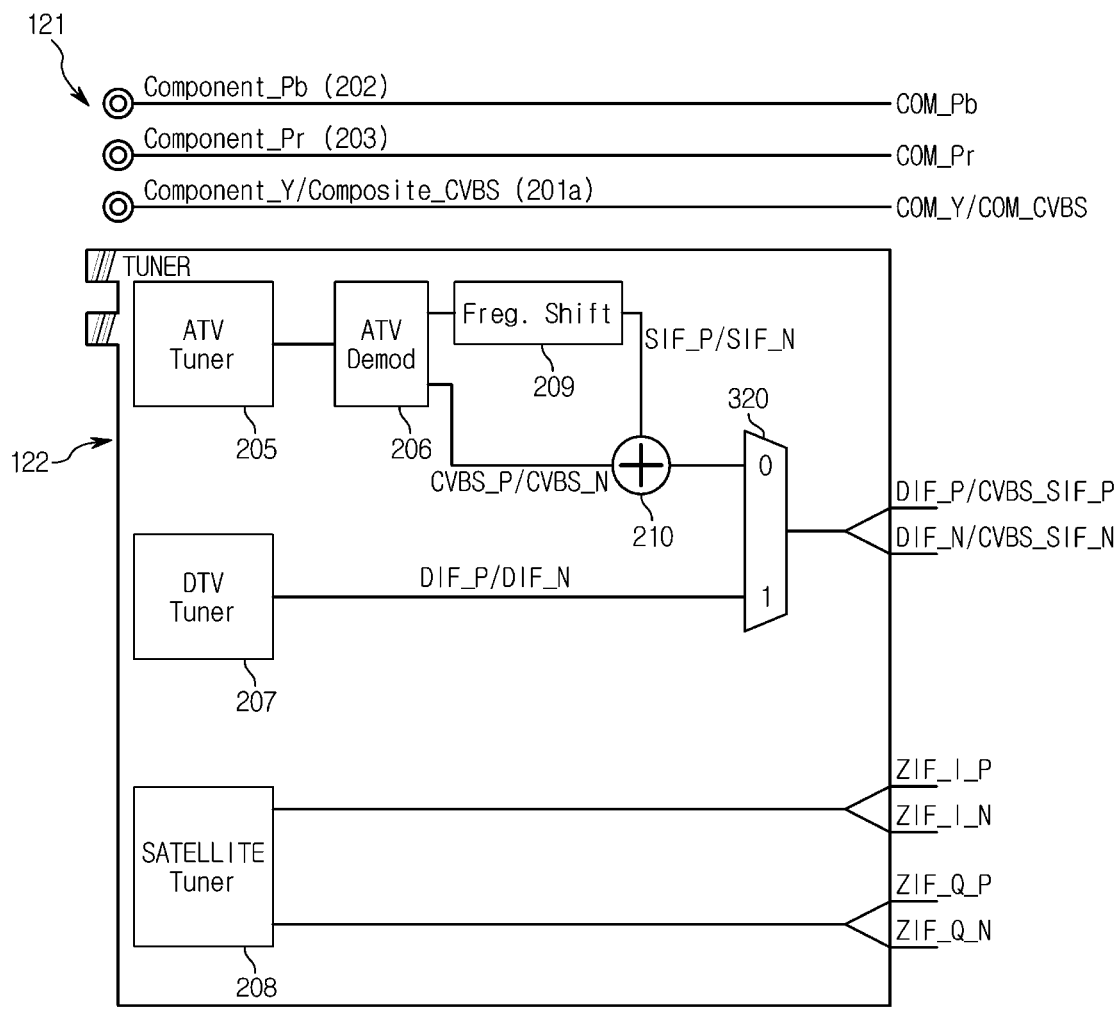
FIG. 15 shows another example of a content receiver included in a display apparatus according to an embodiment.
Figure 16:
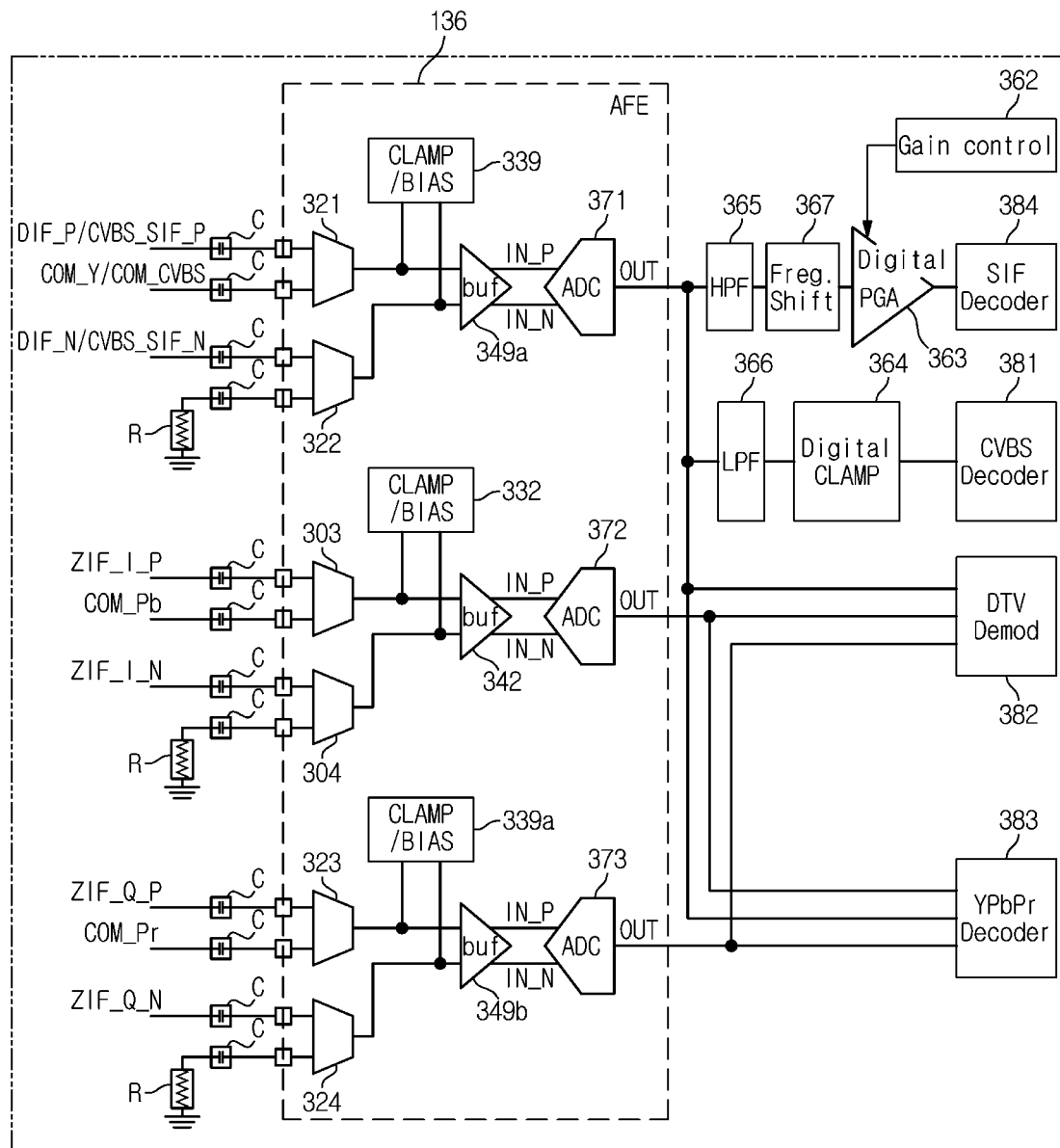
FIG. 16 shows an example of an image processor receiving a signal from the content receiver shown in FIG. 15.

FIG. 15 shows another example of a content receiver included in a display apparatus according to an embodiment. FIG. 16 shows an example of an image processor receiving a signal from the content receiver shown in FIG. 15.

Referring to FIG. 15, the content receiver 120 includes the input terminals 121 and the tuner 122.

The input terminals 121 includes the first component/composite terminal 201a, the second component terminal 202, and the third component terminal 203, and the tuner 122 includes the analog broadcast tuner 205, the analog broadcast demodulator 206, the digital broadcast tuner 207, the satellite broadcast tuner 208, a first frequency shifter 209, a signal synthesizer 210 and a twentieth multiplexer 320.

The first component/composite terminal 201a, the second component terminal 202, the third component terminal 203, the analog broadcast tuner 205, the digital broadcast tuner 207, and the satellite broadcast tuner 208 shown in FIG. 15 may be the same as those shown in FIG. 9.

The analog broadcast demodulator 206 may demodulate the analog intermediate frequency broadcast signal and output the analog broadcast video signals CVBS_P and CVBS_N and the analog broadcast audio signals SIF_P and SIF_N. The analog broadcast video signals CVBS_P and CVBS_N and the analog broadcast audio signals SIF_P and SIF_N may be differential signals. For example, the analog broadcast video signals CVBS_P and CVBS_N include the positive analog broadcast video signal CVBS_P and the negative analog broadcast video signal CVBS_N, and the analog broadcast audio signals SIF_P and SIF_N may include the positive analog broadcast audio signal SIF_P and the negative analog broadcast audio signal SIF_N.

The first frequency shifter 209 may change the frequencies of the analog broadcast audio signals SIF_P and SIF_N. The bandwidth of the analog broadcast signal is approximately 6 MHz (mega-hertz), and the analog broadcast signal having a bandwidth of 6 MHz may include both a video signal and an audio signal. Also, the frequency of the video signal and the frequency of the audio signal may be adjacent to each other.

The first frequency shifter 209 changes the frequency of the analog broadcast audio signals SIF_P and SIF_N in order to clearly distinguish the frequencies of the analog broadcast video signals CVBS_P and CVBS_N and the analog broadcast audio signals SIF_P and SIF N. For example, the first frequency shifter 209 may increase the frequencies of the analog broadcast audio signals SIF_P and SIF_N.

The signal synthesizer 210 may synthesize the analog broadcast video signals CVBS_P and CVBS_N and frequency-shifted analog broadcast audio signals SIF_P and SIF_N, and output video/audio signals CVBS_SIF_P and CVBS_SIF_N. Since the frequency of the analog broadcast audio signals SIF_P and SIF_N is changed by the first frequency shifter 209, in the video/audio signals CVBS_SIF_P and CVBS_SIF_N, the analog broadcast video signals CVBS_P and CVBS_N and the analog broadcast audio signals SIF_P and SIF_N can be clearly distinguished by frequency.

The twentieth multiplexer 320 may be a 4×2 multiplexer that receives four signals and outputs two signals. The twentieth multiplexer 320 may multiplex the positive and negative video/audio signals CVBS_SIF_P and CVBS_SIF_N and the positive and negative digital intermediate frequency signals DIF_P and DIF_N according to the content selection signal of the controller 160.

The twentieth multiplexer 320 receives the positive and negative video/audio signals CVBS_SIF_P and CVBS_SIF_N and the positive and negative digital intermediate frequency signals DIF_P and DIF_N, and outputs any one of the positive and negative video/audio signals CVBS_SIF_P and CVBS_SIF_N and the positive and negative digital intermediate frequency signals DIF_P and DIF_N according to the content selection signal of the controller 160. For example, when analog TV broadcasting is selected, the twentieth multiplexer 320 outputs the positive and negative video/audio signals CVBS_SIF_P and CVBS_SIF_N, and when digital TV broadcasting is selected, the twentieth multiplexer 320 may output the positive and negative digital intermediate frequency signals DIF_P and DIF_N.

As such, the content receiver 120 may output the Y component video signal COM_Y and any of the composite video signal COM_CVBS (hereinafter referred to as 'Y component/composite video signal'), the Pb component video signal COM_Pb, the Pr component video signal COM_Pr, the zero intermediate frequency I signal ZIF_I, and the zero intermediate frequency Q signal ZIF_Q. In addition, the content receiver 120 may output the video/audio signal CVBS_SIF_P and CVBS_SIF_N and any one of the digital intermediate frequency signals DIF_P and DIF_N (hereinafter referred to as 'analog/digital broadcast signal DIF/CVBS_SIF').

In other words, the content receiver 120 can output a total of six signals. The content receiver 120 illustrated in FIG. 15 may output two fewer signals compared to the content receiver 120 illustrated in FIG. 4.

Referring to FIG. 16, the image processor 130 includes the analog front end 136 and the CVBS decoder 381/the digital broadcast demodulator 382/the YPbPr decoder 383/the SIF decoder 384.

The analog front end 136 includes the first analog-to-digital converter 371, the second analog-to-digital converter 372, the third analog-to-digital converter 373, a twenty-first multiplexer 321, a twenty-second multiplexer 322, the third multiplexer 303, the fourth multiplexer 304, a twenty-third multiplexer 323 and a twenty-fourth multiplexer 324.

The first analog-to-digital converter 371, the second analog-to-digital converter 372, the third analog-to-digital converter 373, the third multiplexer 303 and the fourth multiplexer 304 are the same as those shown in FIG. 6.

The twenty-first multiplexer 321 may be a 2×1 multiplexer that receives two signals and outputs one signal. The twenty-first multiplexer 321 may multiplex the Y component/composite video signal COM_Y/COM_CVBS and the positive analog/digital broadcast signal DIF_P/CVBS_SIF_P according to the content selection signal of the controller 160. For example, when a component terminal or a composite terminal is selected, the twenty-first multiplexer 321 outputs the Y component/composite video signal COM_Y/COM_CVBS to the positive input terminal IN_P of the first analog-to-digital converter 371, and when analog broadcasting or digital broadcasting is selected, the sixteenth multiplexer 316 may output the positive analog/digital broadcasting signal DIF_P/CVBS_SIF_P to the positive input terminal IN_P of the first analog-to-digital converter 371.

The twenty-second multiplexer 322 may be a 2×1 multiplexer that receives two signals and outputs one signal. The twenty-second multiplexer 322 may multiplex the negative analog/digital broadcast signal DIF_N/CVBS_SIF_N and the 'ground signal' according to the content selection signal of the controller 160. When the component terminal or the composite terminal is selected, the twenty-second multiplexer 322 outputs the 'ground signal' (the signal of '0') to the negative input terminal IN_N of the first analog-to-digital converter 371. When analog broadcasting or digital broadcasting is selected, the twenty-second multiplexer 322 may output the negative analog/digital broadcasting signal DIF_N/CVBS_SIF_N to the negative input terminal IN_N of the first analog-to-digital converter 371.

The output of the twenty-first multiplexer 321 and the output of the twenty-second multiplexer 322 may be connected to the output of a ninth clamping/biasing circuit 339, respectively. The ninth clamping/biasing circuit 339 may clamp or bias the output of the twenty-first multiplexer 321 and the output of the twenty-second multiplexer 322.

When the Y component/composite video signal COM_Y/COM_CVBS is output from the twenty-first multiplexer 321, to restore the DC component of the Y component/composite video signal COM_Y/COM_CVBS, the ninth clamping/biasing circuit 339 may clamp the output of the twenty-first multiplexer 321 according to the Y component/composite video signal COM_Y/COM_CVBS output from the content receiver 120.

When the positive and negative analog/digital broadcast signals DIF_P/CVBS_SIF_P and DIF_N/CVBS_SIF_N are output from the twenty-first and the twenty-second multiplexers 321 and 322, the ninth clamping/biasing circuit 339 may bias the output of the twenty-first multiplexer 321.

As such, the ninth clamping/biasing circuit 339 can clamp the Y component/composite video signal COM_Y/COM_CVBS, or bias the positive and negative analog/digital broadcast signals DIF_P/CVBS_SIF_P and DIF_N/CVBS_SIF_N.

The output of the twenty-first multiplexer 321 and the output of the twenty-second multiplexer 322 may be input to a tenth buffer 349a. The output currents of the twenty-first multiplexer 321 and the twenty-second multiplexer 322 may be amplified by the tenth buffer 349a.

The first analog-to-digital converter 371 receives the output of the twenty-first multiplexer 321 and the output of the twenty-second multiplexer 322 passing through the tenth buffer 349a, and the difference (analog signal) between the output of the twenty-first multiplexer 321 and the output of the twenty-second multiplexer 322 may be converted into a digital signal (digital code).

The output of the first analog-to-digital converter 371 may be input to the SIF decoder 384, the CVBS decoder 381, the digital broadcast demodulator 382, and the YPbPr decoder 383.

A digital high-pass filter 365, a second frequency shifter 367, and the digital PGA circuit 363 may be provided between the output of the first analog-to-digital converter 371 and the input of the SIF decoder 384.

The digital high-pass filter 365 may extract the audio signal SIF from the video/audio signals CVBS_SIF_P and CVBS_SIF_N output from the first analog-to-digital converter 371. For example, the digital high-pass filter 365 can pass the high-frequency audio signal SIF and block the low-frequency video signal Tuner_CVBS.

The second frequency shifter 367 may restore the frequency of the audio signal SIF to the original frequency band. For example, the second frequency shifter 367 may restore the frequency of the audio signal SIF to a frequency before being changed by the first frequency shifter 209.

The digital PGA circuit 363 may amplify the audio signal SIF according to the gain control signal of the gain controller 362.

A digital low-pass filter 366 and the digital clamping circuit 364 may be provided between the output of the first analog-to-digital converter 371 and the input of the CVBS decoder 381.

The digital low-pass filter 366 may extract the video signal Tuner_CVBS from the video/audio signals CVBS_SIF_P and CVBS_SIF_N output from the first analog-to-digital converter 371. For example, the digital high-pass filter 365 may pass the low-frequency video signal Tuner_CVBS and block the high-frequency audio signal SIF.

The digital clamping circuit 364 may restore the DC component of the digitized analog broadcast video signals CVBS_P and CVBS_N. The digital clamping circuit 364 may clamp the output of the digital low-pass filter 366 according to the video/audio signals CVBS_SIF_P and CVBS_SIF_N output from the content receiver 120.

The twenty-third multiplexer 323 may be a 2×1 multiplexer that receives two signals and outputs one signal. The twenty-third multiplexer 323 may multiplex the positive zero intermediate frequency Q signal ZIF_Q_P and the Pr component video signal COM_Pr according to the content selection signal of the controller 160. When satellite digital broadcasting is selected, the twenty-third multiplexer 323 outputs the positive zero intermediate frequency Q signal ZIF_Q_P to the positive input terminal IN_P of the third analog-to-digital converter 373. When the component terminal is selected, the twenty-third multiplexer 323 may output the Pr component video signal COM_Pr to the positive input terminal IN_P of the third analog-to-digital converter 373.

The twenty-third multiplexer 323 may be a 2×1 multiplexer that receives two signals and outputs one signal. The twenty-third multiplexer 323 may multiplex the positive zero intermediate frequency Q signal ZIF_Q_P and the Pr component video signal COM_Pr according to the content selection signal of the controller 160. When satellite digital broadcasting is selected, the twenty-third multiplexer 323 outputs the positive zero intermediate frequency Q signal ZIF_Q_P to the positive input terminal IN_P of the third analog-to-digital converter 373, and when the component terminal is selected, the twenty-third multiplexer 323 may output the Pr component video signal COM_Pr to the positive input terminal IN_P of the third analog-to-digital converter 373.

The twenty-fourth multiplexer 324 may be a 2×1 multiplexer that receives two signals and outputs one signal. The twenty-fourth multiplexer 324 may multiplex the negative zero intermediate frequency Q signal ZIF_Q_N and the 'ground signal' according to the content selection signal of the controller 160. When satellite digital broadcasting is selected, the twenty-third multiplexer 323 outputs the negative zero intermediate frequency Q signal ZIF_Q_N to the negative input terminal IN_N of the third analog-to-digital converter 373, and when the component terminal is selected, the twenty-third multiplexer 323 may output the 'ground signal' to the negative input terminal INN of the third analog-to-digital converter 373.

The output of the twenty-third multiplexer 323 and the output of the twenty-fourth multiplexer 324 may be connected to the output of a tenth clamping/biasing circuit 339a, respectively. The tenth clamping/biasing circuit 339a may clamp or bias the output of the twenty-third multiplexer 323 and the output of the twenty-fourth multiplexer 324.

When the Pr component video signal COM_Pr is output from the twenty-third multiplexer 323, to restore the DC component of the Pr component video signal COM_Pr, the tenth clamping/biasing circuit 339a may clamp the output of the twenty-third multiplexer 323 according to the Pr component video signal COM_Pr output from the content receiver 120.

When the positive and negative zero intermediate frequency Q signals ZIF_Q_P and ZIF_Q_N are output from the twenty-third and twenty-fourth multiplexers 323 and 324, the tenth clamping/biasing circuit 339a may bias the outputs of the twenty-third and twenty-fourth multiplexers 323 and 324.

As such, the tenth clamping/biasing circuit 339a may clamp the Pr component video signal COM_Pr or bias the positive and negative zero intermediate frequency Q signals ZIF_Q_P and ZIF_Q_N.

The output of the twenty-third multiplexer 323 and the output of the twenty-fourth multiplexer 324 may be input to an eleventh buffer 349b. The output currents of the twenty-third multiplexer 323 and the twenty-fourth multiplexer 324 may be amplified by the eleventh buffer 349b.

The third analog-to-digital converter 373 receives the output of the twenty-third multiplexer 323 and the output of the twenty-fourth multiplexer 324 passing through the eleventh buffer 349b. The difference (analog signal) between the output of the twenty-third multiplexer 323 and the output of the twenty-fourth multiplexer 324 may be converted into a digital signal (digital code).

The output of the third analog-to-digital converter 373 may be input to the digital broadcast demodulator 382 and the YPbPr decoder 383.

In this way, the content receiver 120 synthesizes the analog broadcast video signal and the analog broadcast audio signal, therefore the number of input signals to the analog front end 136 may be reduced.

However, the content receiver 120 is not limited to multiplexing of the video/audio signals CVBS_SIF_P and CVBS_SIF_N and the digital intermediate frequency signals DIF_P and DIF_N. For example, the video/audio signals CVBS_SIF_P and CVBS_SIF_N and the zero intermediate frequency I signals ZIF_I_P and ZIF_I_N may be multiplexed, or the video/audio signals CVBS_SIF_P and CVBS_SIF_N and the zero intermediate frequency Q signals ZIF_Q_P and ZIF_Q_N may be multiplexed.

As described above, by multiplexing the input signals using an appropriate multiplexer, the number of analog-to-digital converters included in the analog front end can be minimized, and the number of signal lines between the content receiver and the analog front end can be minimized.

Meanwhile, the disclosed embodiments may be implemented in the form of a recording medium that stores instructions executable by a computer. The instructions may be stored in the form of a program code, and when executed by a processor, may generate program modules to perform operations of the disclosed embodiments. The recording medium may be embodied as a computer-readable recording medium.

The computer-readable recording medium includes all kinds of recording media storing instructions that can be read by a computer. For example, there may be read only memory (ROM), random access memory (RAM), a magnetic tape, a magnetic disk, flash memory, and an optical data storage device.

As described above, the disclosed embodiments have been described with reference to the accompanying drawings. Those of ordinary skill in the art to which the posted embodiments belong will understand that they may be practiced in different forms from the disclosed embodiments without changing the technical spirit or essential features of the posted embodiments. The disclosed embodiments are illustrative and should not be construed as limiting.

The invention claimed is:

1. A display apparatus comprising:
an input terminal configured to receive an analog video signal;
a tuner configured to receive a broadcast signal;
a rear multiplexer configured to multiplex the analog video signal and an output signal of the tuner;
an analog-digital converter configured to convert the output signal of the rear multiplexer into a digital signal;
a decoder configured to decode the digital signal,
wherein the tuner includes:
an analog broadcast tuner configured to output an analog broadcast video signal and an analog broadcast audio signal;
a digital broadcast tuner configured to output a digital broadcast signal; and
a front multiplexer configured to multiplex the analog broadcast video signal and the digital broadcast signal.

2. The display apparatus of claim 1, further comprising: a clamping/biasing circuit configured to clamp or bias the output signal of the rear multiplexer according to the analog video signal or the output signal of the tuner.

3. The display apparatus of claim 2, wherein:
the clamping/biasing circuit is configured to clamp or bias the output signal of the rear multiplexer according to the analog video signal or the output signal of the tuner when the analog video signal or the analog broadcast video signal is outputted from the rear multiplexer.

4. The display apparatus of claim 2, wherein:
the clamping/biasing circuit is configured to bias the output signal of the rear multiplexer when the digital broadcast signal is outputted from the rear multiplexer.

5. The display apparatus of claim 1, wherein:
the front multiplexer is configured to multiplex the analog broadcast video signal and the digital broadcast signal to output a front multiplexed signal, and
the analog-digital converter is configured to convert the front multiplexed signal into a digital output signal, and
the display apparatus further comprises: a digital clamping circuit configured to clamp the digital output signal of the analog-digital converter.

6. The display apparatus of claim 1, wherein:
the analog-digital converter is configured to convert the analog broadcast audio signal into a digital output signal, and the display apparatus further comprises: a variable gain amplifier configured to amplify the digital output signal of the analog-digital converter and a gain controller configured to control an amplification factor of the variable gain amplifier.

7. The display apparatus of claim 1, further comprising:
a variable gain amplifier configured to amplify a digital output signal and a gain controller configured to control an amplification factor of the variable gain amplifier.

8. The display apparatus of claim 1, wherein:
the front multiplexer configured to multiplex the analog broadcast video signal and the digital broadcast signal, and
the tuner further comprises: a satellite broadcast tuner configured to output a satellite broadcast signal and another front multiplexer configured to multiplex the analog broadcast audio signal and the satellite broadcast signal.

9. The display apparatus of claim 1, wherein:
the tuner further comprises: a first frequency shifter configure to output a frequency shift audio signal by changing a frequency of the analog broadcast audio signal, and a signal synthesizer configured to synthesize the frequency shifted audio signal and the analog broadcast video signal, and
the front multiplexer configured to multiplex the output signal of the signal synthesizer and the digital broadcast signal.

10. The display apparatus of claim 9, further:
comprising: a first filter configured to extract the frequency shifted audio signal from the output signal of the analog-digital converter, a second frequency shifter configured to restore the analog broadcast audio signal by changing the frequency shifted audio signal, and a second filter configured to extract the analog broadcast video signal from the output signal of the analog-digital converter.

11. A controlling method of a display apparatus comprising:
first multiplexing an analog broadcast video signal received through a tuner and a digital broadcast signal received through the tuner;
second multiplexing an analog video signal received through an input terminal, and a first multiplexed signal;
converting a second multiplexed signal into a digital signal; and
decoding the digital signal.

12. The method of claim 11, wherein:
the method further comprises: clamping or biasing the second multiplexed signal according to the analog video signal or an output signal of the tuner.

13. The method of claim 12, wherein:
the clamping or biasing the second multiplexed signal includes the clamping of the second multiplexed signal according to the analog video signal or the output signal of the tuner when the second multiplexed signal includes the analog video signal or the analog broadcast video signal.

14. The method of claim 12, wherein:
the clamping or biasing the second multiplexed signal includes the biasing of the second multiplexed signal when the second multiplexed signal includes the digital broadcast signal.

15. The method of claim 11, wherein:
the first multiplexing includes multiplexing the analog broadcast video signal and the digital broadcast signal, and
the method further comprises clamping the digital signal.

* * * * *